United States Patent
Tian et al.

(10) Patent No.: US 11,371,688 B1
(45) Date of Patent: Jun. 28, 2022

(54) AUTOMOBILE ACCESSORY LIGHT FIXTURE MITIGATING RF EMISSIONS

(71) Applicant: Putco, Inc., Des Moines, IA (US)

(72) Inventors: Xiao Jun Tian, Guangzhou (CN); Conner Schramm, Des Moines, IA (US); James P. Elwell, Grimes, IA (US); Matthew Thompson, Des Moines, IA (US); Seth Hoogendoorn, Des Moines, IA (US); Parker Freeman, Des Moines, IA (US)

(73) Assignee: Putco, Inc., Des Moines, IA (US)

( * ) Notice: Subject to any disclaimer, the term of this patent is extended or adjusted under 35 U.S.C. 154(b) by 0 days.

(21) Appl. No.: 17/455,154

(22) Filed: Nov. 16, 2021

(51) Int. Cl.
| | |
|---|---|
| *F21V 25/10* | (2006.01) |
| *F21V 23/06* | (2006.01) |
| *F21V 23/00* | (2015.01) |
| *B60Q 1/00* | (2006.01) |
| *B60Q 1/26* | (2006.01) |
| *F21Y 115/10* | (2016.01) |

(52) U.S. Cl.
CPC ............ *F21V 25/10* (2013.01); *B60Q 1/0023* (2013.01); *B60Q 1/0088* (2013.01); *B60Q 1/2626* (2013.01); *F21V 23/003* (2013.01); *F21V 23/06* (2013.01); *F21Y 2115/10* (2016.08)

(58) Field of Classification Search
None
See application file for complete search history.

(56) References Cited

U.S. PATENT DOCUMENTS

| | | |
|---|---|---|
| 7,931,393 B2 | 4/2011 | Stempinski |
| 8,752,989 B2 | 6/2014 | Roberts et al. |
| 9,840,188 B2 | 12/2017 | Salter et al. |
| 9,987,973 B2 | 6/2018 | Elwell et al. |
| 10,634,305 B1 | 4/2020 | Elwell et al. |
| 2017/0338848 A1* | 11/2017 | Sharma ................ H04W 52/02 |

* cited by examiner

*Primary Examiner* — Ashok Patel
(74) *Attorney, Agent, or Firm* — McKee, Voorhees & Sease, PLC

(57) ABSTRACT

A lighted accessory and/or corresponding method of installation seamlessly replace an original equipment manufacturer (OEM) lighting apparatus and/or accessory. The accessory includes a front side and back side with a circuit board positioned therebetween. One side of the accessory includes translucent portion(s). The circuit board includes a plurality of light emitting diodes (LEDs) which are aligned with the translucent portion of the front side of the accessory such that when the LEDs are illuminated, light is emitted from the accessory. The circuit board also includes at least one microcontroller and a radio-frequency interference filter circuit wherein the microcontroller controls the LEDs and the radio-frequency interference filter circuit mitigates RF emissions.

13 Claims, 19 Drawing Sheets

AUTOMOBILE ACCESSORY LIGHT FIXTURE MITIGATING RF EMISSIONS

FIELD OF THE INVENTION

The present invention relates generally to a lighting apparatus and/or a corresponding method(s) of use, manufacture, and/or installation having industrial applications in at least the automobile industry. More particularly, but not exclusively, the present invention relates to an external automobile light fixture mitigating RF emissions.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Automobile and other motor vehicle manufacturers often include an accessory or emblem incorporating the manufacturer's logo on their products. These types of emblems produced and included in products by the manufacturer are called original equipment manufacturer (OEM) components. An example of an OEM emblem on a vehicle may be the manufacturer's logo or name printed, or otherwise placed, on a portion of the vehicle such as the front or rear. Several problems exist with these types of OEM emblems. They often wear out, break down, and/or degrade. Additionally, oftentimes customers have negative opinions regarding the aesthetic quality of the OEM emblems. It is often difficult to replace old, worn out, and/or degraded OEM emblems and accessories.

Additionally, some lighting systems used in general, and especially with motor vehicles, emit radiated radio-frequency (RF) emissions. Exposure to RF emissions and radio-frequency energy may be harmful to the health of any exposed individuals.

OEM emblems and other accessories often are not lighted. Therefore, they often are difficult to see and also do not provide any type of safety by increasing visibility of the vehicle. Motor vehicle collisions occur each and every day, often due to poor visibility of vehicles.

Thus, there exists a need in the art for an apparatus which easily and seamlessly replaces old, worn out, and/or degraded OEM emblems on vehicles and that provides aesthetic quality.

There also exists a need in the art for a method to easily replace an OEM accessory on a vehicle.

There also exists a need in the art for a lighted accessory to be used with vehicles that can mitigate RF emissions.

There also exists a need in the art for a lighted accessory to be used with vehicles that can enhance overall safety by increasing visibility of the vehicle.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to provide a lighting apparatus that seamlessly replaces OEM emblems on vehicles using OEM mounts.

It is a further object, feature, and/or advantage of the present invention to provide a lighting apparatus to be mounted on vehicles that is aesthetically pleasing.

It is a further object, feature, and/or advantage of the present invention to provide a lighting apparatus to be used with vehicles that mitigates RF emissions.

It is a further object, feature, and/or advantage of the present invention to provide a lighting apparatus to be used with vehicles that can improve overall safety by increasing visibility of the vehicle.

It is still yet a further object, feature, and/or advantage of the present invention to make the lighting apparatus compatible with camera and washing systems.

It is still yet a further object, feature, and/or advantage of the present invention to plug and play direct from the lighting apparatus to a fuse box.

It is still yet a further object, feature, and/or advantage of the present invention for the lighting apparatus to deliver light with desirable characteristics. Said characteristics can include but are not limited to intensity, color temperature, and beam pattern/shape (narrow beam, wide beam, etc.).

The lighting apparatus disclosed herein can be used in a wide variety of applications. For example, the lighting apparatus can be used in both the front and rear of the vehicle. And aspects described herein can be customized to mount to existing OEM mounting points on virtually any make and model of vehicle (e.g., designed to be compatible with a Ford Super Duty, a Jeep Wrangler, etc.) or designed so as to be substantially universal to all vehicles.

It is preferred the apparatus be safe, cost effective, and durable. For example, the lighting apparatus can be adapted to resist excessive thermal transfer, static electricity, and ingress of water, such that the lighting apparatus is substantially weatherproof. The lighting apparatus is also preferably durable enough to withstand the elements and debris from the road without failing (e.g., cracking, crumbling, shearing, creeping) due to excessive and/or prolonged exposure to impacts and/or tensile, compressive, and/or balanced forces acting on the lighting apparatus and/or its mounts.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, installation and repair of the lighting apparatus which accomplish some or all of the previously stated objectives. For example, methods of installation may require the user to replace an OEM emblem by removing a portion of the front bumper to remove the grille to access the emblem.

The lighting apparatus can be incorporated into systems or kits which accomplish some or all of the previously stated objectives.

According to some aspects of the present disclosure, a lighted accessory for use with a vehicle is provided, the accessory comprises a housing that can form a front side of the accessory, wherein at least a portion of the front side is translucent; the housing can also form a back side of the accessory attached to the front side; a circuit board positioned between the front side and back side of the accessory comprising a plurality of light emitting diodes (LEDs) in alignment with the translucent portions of the front side of the accessory, a microcontroller to control when the plurality of LEDs are powered ON and OFF, and a radio-frequency interference filter circuit (RFI circuit) to mitigate RF emissions, and wherein the lighted accessory further comprises a connection assembly adapted to electrically connect the accessory with an electrical system of the vehicle.

According to some additional aspects of the present disclosure, the circuit board further comprises a transient protection circuit. The transient protection circuit can comprise a transient suppressor and/or a transient voltage suppressor.

According to some additional aspects of the present disclosure, the front side of the emblem housing further comprises a logo, a camera opening, and a washer nozzle opening.

According to some additional aspects of the present disclosure, the connection assembly comprises a first fuse, a second fuse, a fuse harness, a fuse tap, and at least one wire, wherein the first fuse, second fuse, fuse harness, and fuse tap are electrically connected to the circuit board via the at least one wire, and the fuse tap is adapted to connect the circuit board to the electrical system of the vehicle.

According to some additional aspects of the present disclosure, the fuse harness is a first jumper port.

According to some additional aspects of the present disclosure, the lighted accessory further comprises a second jumper port that is located on the circuit board and comprises a serial peripheral interface (SPI) bus.

According to some additional aspects of the present disclosure, the back side of the emblem further comprises at least one aperture for mounting the emblem to the vehicle and at least one aperture for the at least one wire to extend therethrough.

According to some additional aspects of the present disclosure, the circuit board further comprises a constant current control circuit that, in conjunction with the microcontroller, provides a steady current to the plurality of LEDs.

According to some additional aspects of the present disclosure, the RFI filter circuit comprises some combination of at least one inductor and at least one capacitor.

According to some additional aspects of the present disclosure, the electrical system of the vehicle comprises a fuse box and/or power source.

According to some additional aspects of the present disclosure, the accessory is compatible with a camera and washing system.

According to some additional aspects of the present disclosure, the plurality of LEDs comprises a chip on board ("COB") LEDs layout for crisp illumination day or night.

According to some other aspects of the present disclosure, a method for installing a lighted accessory onto a vehicle is provided, the method comprises extending one or more threaded rods through one or more apertures of the accessory, extending the one or more threaded rods through a stabilizing member, mounting the accessory to the vehicle by screwing one or more nuts on the one or more rods wherein the stabilizing member through which the one or more rods extend is located between the accessory and the one or more nuts, and electrically connecting the accessory to an electrical system of the vehicle.

According to some additional aspects of the present disclosure, the stabilizing member comprises a portion of the vehicle and/or a mounting adaptor.

According to some additional aspects of the present disclosure, the accessory can be mounted to the front or the rear of the vehicle.

According to some additional aspects of the present disclosure, the step of electrically connecting the accessory to the electrical system of the vehicle comprises connecting a wire that is electrically connected to the accessory to a fuse harness, electrically connecting the fuse harness to a fuse tap, and inserting the fuse tap into a fuse box and/or otherwise electrically connecting the fuse tap to the electrical system of the vehicle.

According to some additional aspects of the present disclosure, the step of electrically connecting the accessory to the electrical system of the vehicle further comprises inserting a first fuse into the fuse tap.

According to some additional aspects of the present disclosure, the step of electrically connecting the accessory to the electrical system of the vehicle further comprises removing a second fuse from the fuse box and inserting the second fuse into the fuse tap.

According to some additional aspects of the present disclosure, the method further comprises electrically connecting the accessory to a tail lamp of the vehicle when the accessory is mounted to the rear of the vehicle.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
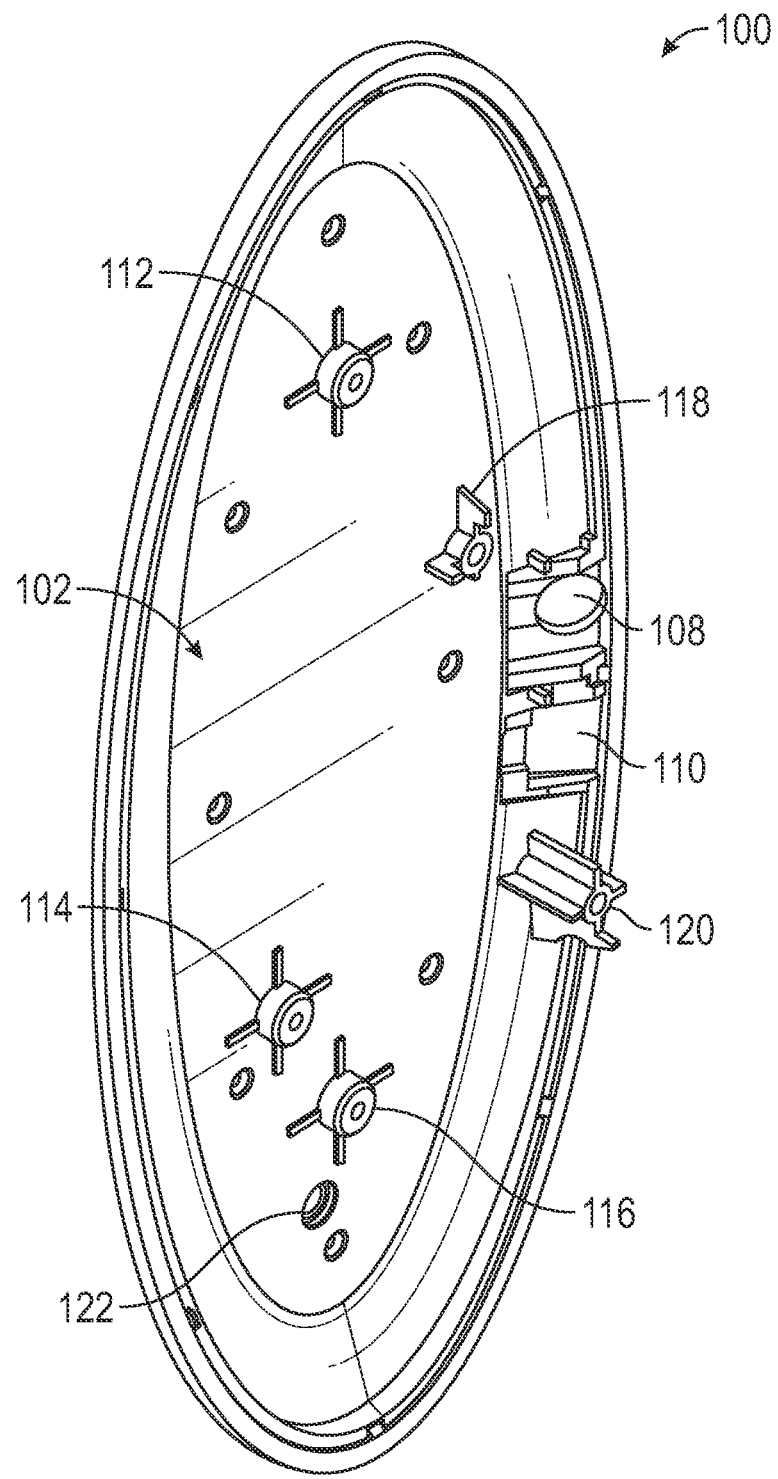
FIG. 1 is a perspective view of the back side of an exemplary accessory according to some aspects of the disclosure.

FIG. 1 shows the back side 102 of an exemplary accessory 100, which can also be referred to as an emblem 100, according to some aspects of the disclosure. As is disclosed later in the disclosure, the emblem 100 is configured to be attached/mounted to the outer frame/exterior of a vehicle, such as an automobile, as well as being configured to be attached/connected/electrically connected to the vehicle's electrical system. The embodiment of the emblem 100 of FIG. 1 includes a back side 102. The back side 102 is the side of the emblem 100 which faces a vehicle and/or is in contact with a vehicle when the emblem 100 is attached/mounted to the exterior/frame of a vehicle. The embodiment of FIG. 1 further includes first, second, and third rod apertures 112, 114, 116. While the exemplary embodiment of FIG. 1 includes three rod apertures, the back side 102 of the emblem 100 may comprise any number of rod apertures numbering from zero to N, where N can be any number greater than zero. As described later in the disclosure, each rod aperture 112, 114, 116 is configured to receive, accept, and/or take in a rod, which helps facilitate the attachment of the emblem 100 to a vehicle. The rod apertures 112, 114, 116 may be threaded to ensure an adequate connection with each rod, wherein each rod may also be threaded. In embodiments that include zero rod apertures, other means may be used to attach the emblem 100 to a vehicle.

FIG. 1 also shows first and second fasteners 118 and 120. While the exemplary embodiment of FIG. 1 includes two fasteners, the back side 102 of the emblem 100 may comprise any number of fasteners numbering from zero to N, where N can be any number greater than zero. As described later in the disclosure and similar to the rod apertures, the fasteners 118, 120 help facilitate the attachment of the emblem 100 to a vehicle and/or to facilitate attachment of a separate assembly to the emblem 100. The fasteners 118, 120 may be configured to facilitate attachment by receiving, accepting, and/or taking in a screw. Other means of attachment may be utilized. For example, the fasteners 118, 120 may be configured to accept rods similar to the rod apertures. Alternatively, the fasteners may be configured to be any type of attachment/connection apparatus such as but not limited to clips, push pins, threaded connectors, and the like.

FIG. 1 also shows an opening 108 for a camera and an opening 110 for a washer nozzle. The embodiment depicted in FIG. 1 is configured to be able to include a camera wherein the camera may be positioned at, near, and/or within the camera opening 108. Similarly, the embodiment of FIG. 1 is configured to be able to include a washer nozzle wherein the washer nozzle may be positioned at, near, and/or within the washer nozzle opening 110. FIG. 1 also shows an aperture 122 configured for a wire or wires to extend therethrough. As is described later in the disclosure, the emblem 100 may include one or more wires by which the emblem 100 may be electrically connected to the electrical system of the vehicle to which it is attached/mounted. The wire aperture 122 provides organization and structure for the wiring of the emblem 100 to be attached to the electrical system of a vehicle. As will be described later in the disclosure, one or more wires may be attached to a circuit board positioned within the emblem 100 and extend through the wire aperture 122 to be electrically connected to the electrical system of the vehicle to which the emblem 100 is attached/mounted. In the embodiment of FIG. 1 the wire aperture 122 is positioned on the back 102 of the emblem 100, however, the wire aperture may be positioned anywhere on the emblem 100.

Figure 2:
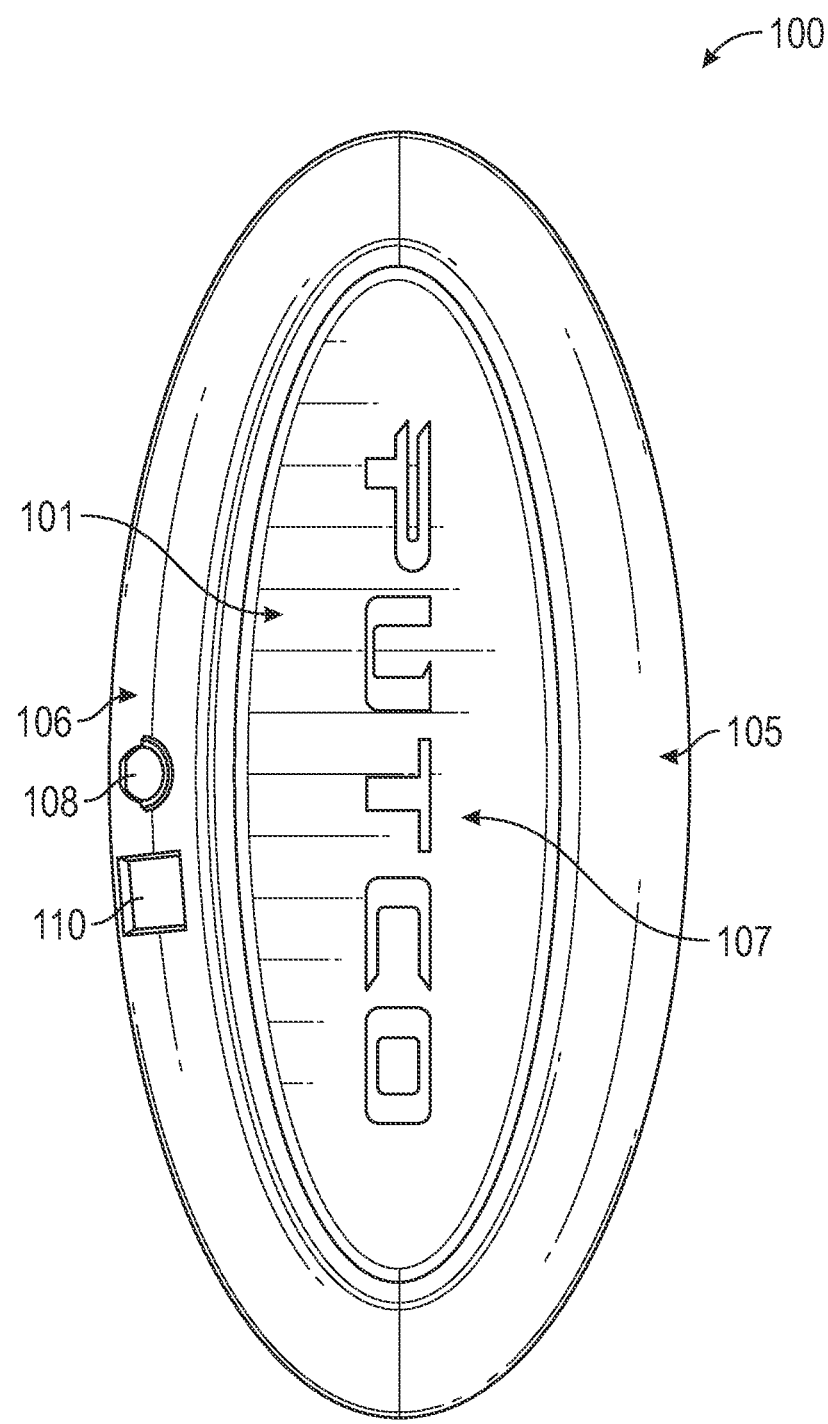
FIG. 2 is an elevation view of the front side of the exemplary accessory of FIG. 1.

FIG. 2 shows the front side 101 of the exemplary emblem 100 depicted in FIG. 1. The front side 101 of the emblem 100 faces away from a vehicle to which the emblem 100 is attached/mounted such that the front side 101 is displayed to individuals looking at the vehicle. The front 101 and back 102 sides of the emblem 100 are attached so that there is space, i.e., a hollow, enclosed area, between the front 101 and back 102. Thus, an object could be positioned within the emblem 100 between its front 101 and back 102. At least part of the front side 101 of the emblem 100 is translucent wherein light being emitted from within the emblem 100 (i.e., from between the front and back side) may escape from the translucent portion(s) of the front 101 of the emblem 100. The embodiment depicted in FIG. 2 shows the top 105 and bottom 106 of the emblem 100. The embodiment depicted in FIG. 2 also shows that the exemplary emblem 100 may include a logo 107. The logo 107 may be positioned on the front 101 of the emblem 100. The logo 107 may be any kind of logo such as a graphic, figure, drawing, picture, wording, text, or the like. The logo 107 could be the logo of the manufacturer of the vehicle to which the emblem 100 is attached. The logo 107 may be or include the translucent portion or portions of the front 101 of the emblem 100 so that the light that escapes from within the emblem 100 escapes from a portion or portions of the logo 107. FIG. 2 also shows the camera opening 108 and washer nozzle opening 110 from a different perspective than that shown in FIG. 1. Some embodiments may not include a camera opening 108 and/or a washer nozzle opening 110.

Figure 3:
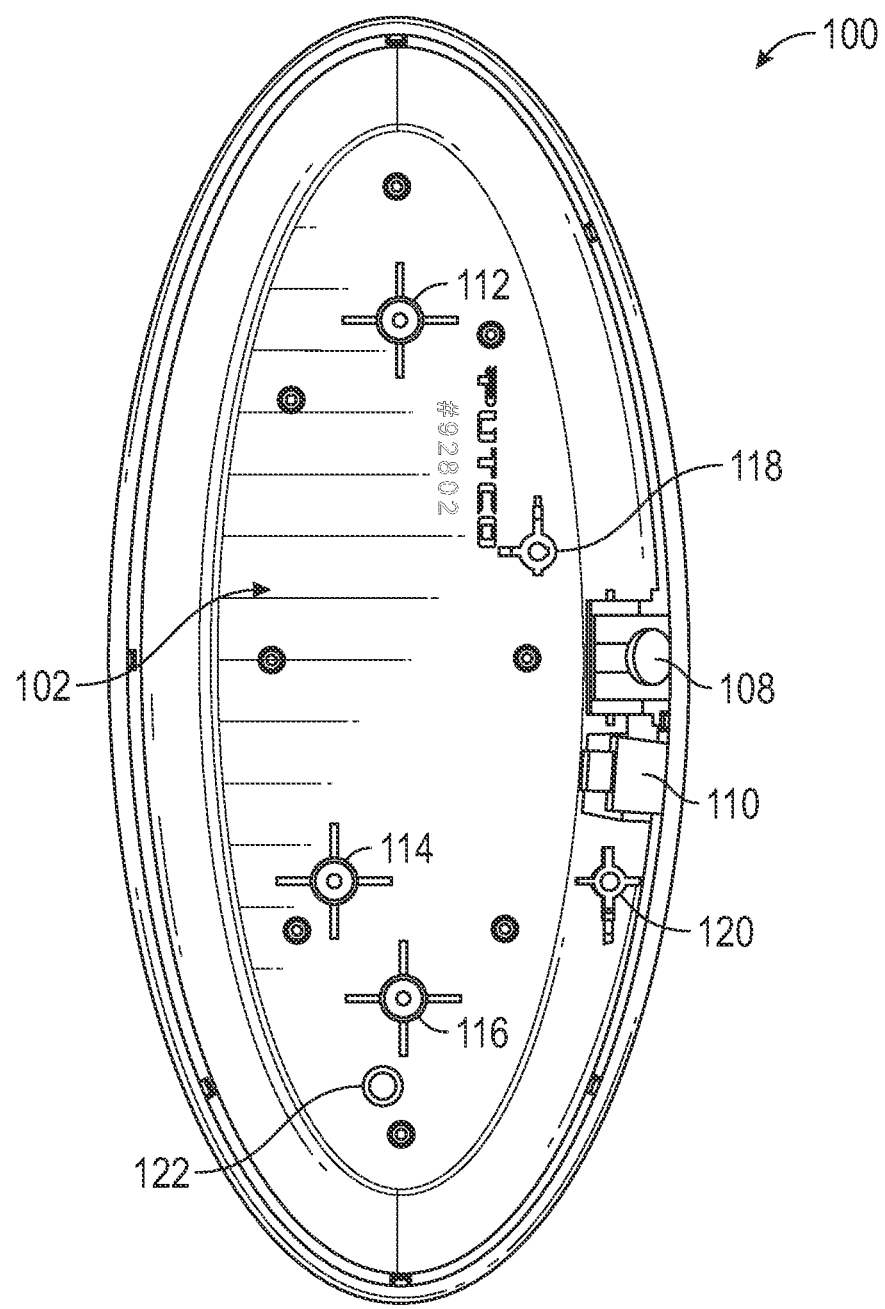
FIG. 3 is an elevation view of the back side of the exemplary accessory of FIG. 1.

FIG. 3 shows an elevated view of the back side 102 of the emblem 100 depicted in FIG. 1. Thus, the embodiment of FIG. 3 includes the same components as that depicted in FIG. 1 but offers a different perspective.

Figure 4:
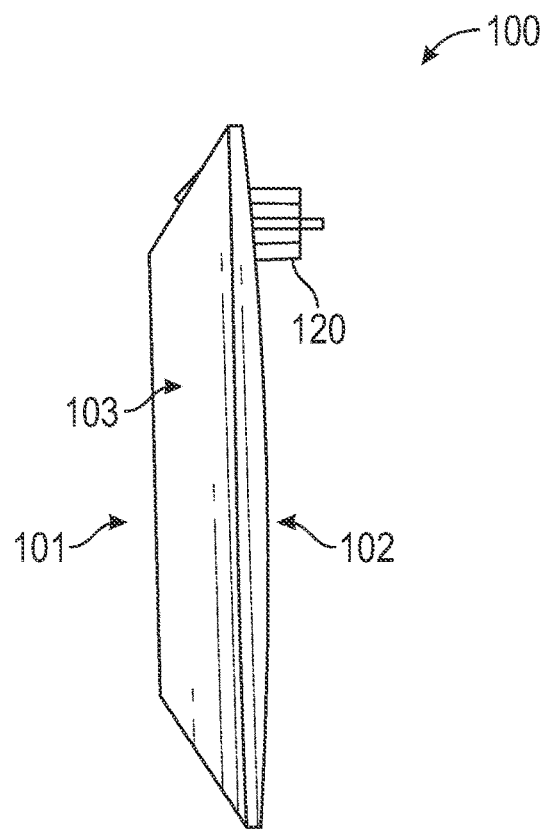
FIG. 4 is an elevation view of the right-hand side of the exemplary accessory of FIG. 1.

FIG. 4 shows the right-hand side 103 of the emblem 100 depicted in FIGS. 1-3. The second fastener 120 is visible in the view of the emblem 100 depicted in FIG. 4. FIG. 4 shows that the front 101 and back 102 of the emblem 100 are attached to form an enclosed emblem 100 with a hollow, enclosed space or area positioned between the front 101 and back 102 sides of the emblem 100. Thus, as is described later in the disclosure, a circuit board could be positioned within the emblem 100 in the hollow, enclosed space between the front 101 and back 102 of the emblem 100.

Figure 5:
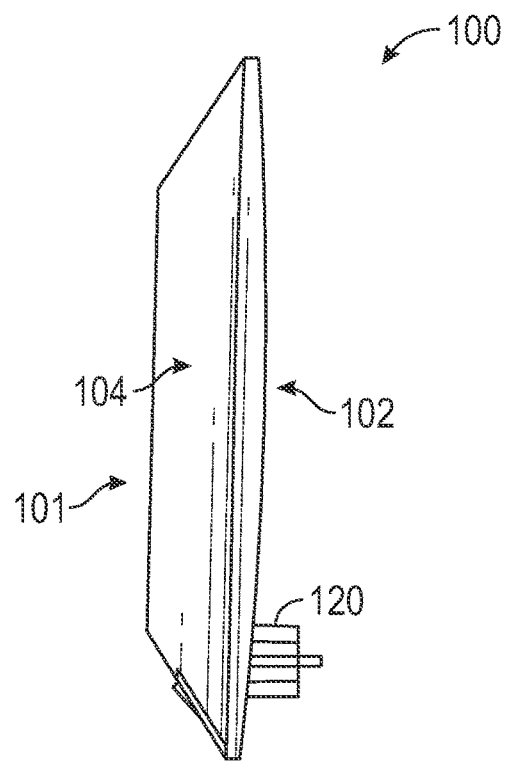
FIG. 5 is an elevation view of the left-hand side of the exemplary accessory of FIG. 1.

FIG. 5 shows the left-hand side 104 of the emblem 100 depicted in FIGS. 1-4. The second fastener 120 is visible in the view of the emblem 100 depicted in FIG. 5. Just as in FIG. 4, FIG. 5 shows that the front 101 and back 102 of the emblem 100 are attached to form an enclosed emblem 100 with a hollow space or area positioned between the front 101 and back 102 sides of the emblem 100, such that a circuit board and/or other object could be positioned in the hollow space.

Figure 6:
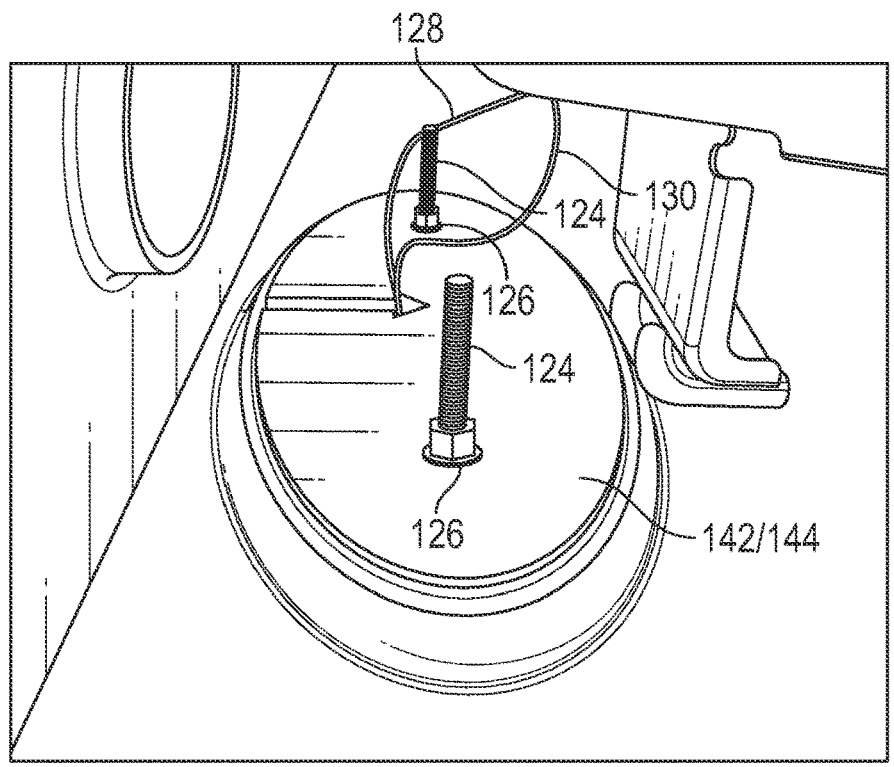
FIG. 6 is a perspective view of an exemplary accessory in a mounted state according to some embodiments.

FIG. 6 shows an exemplary emblem in a mounted state. FIG. 6 shows a stabilizing member 142 covering an emblem to provide support, stability, and protection to the emblem, and to facilitate attaching/mounting the emblem to the vehicle. The exemplary embodiment in FIG. 6 shows a mounting adaptor 144 used as the stabilizing member 142 to hold the emblem in place and attach/mount the emblem to a vehicle. However, other types of stabilizing members may be used such as simply a portion of the vehicle acting as a stabilizing member 142. FIG. 6 also shows two threaded rods 124 extending through apertures in the mounting adaptor 142. These rods 124 also extend through rod apertures in the back of the mounted emblem, however this is not visible in FIG. 6. While two rods are used in the exemplary embodiment of FIG. 6, any number of rods may be used numbering from zero to N, where N can be any number greater than zero. In an example using zero rods, other attachment apparatus may be used. Also, while the exemplary embodiment of FIG. 6 includes threaded rods, other types of rods may be used.

Each rod 124 shown in FIG. 6 includes a nut 126 to stabilize/secure the mounting adaptor 144 which covers the emblem and holds the emblem in place, effectively mounting the emblem to the vehicle. In some embodiments, including the embodiment of FIG. 6, the mounting adaptor 144 is positioned between the one or more nuts 126 and the emblem. The embodiment of FIG. 6 also includes two wires: a first wire 128 and a second wire 130. The wires 128, 130 are used to electrically connect the emblem to an electrical system of the vehicle to which the emblem is attached. The stabilizing member 142 used to mount the emblem may include one or more apertures through which the first 128 and second 130 wires may extend. While two wires are shown in FIG. 6, any number of wires may be used numbering from 1 to N, where N is any number greater than 1. More description regarding electrically connecting the emblem to the electrical system of the vehicle is provided later in the disclosure.

In some embodiments the stabilizing member 142 and/or mounting adaptor 144 may be OEM components. Before mounting the emblem 100 to a vehicle as shown in FIG. 6, a user may first uninstall an OEM emblem, which may have been mounted on the vehicle during manufacture of the vehicle. The OEM emblem may have been mounted on the vehicle using the stabilizing member 142 and in the same manner as the presently disclosed emblem 100 will be mounted on the vehicle. Once the OEM emblem is uninstalled from the vehicle, including disconnecting any electrical connections associated with the OEM emblem as well as any other type of connections associated with the OEM emblem, a user may install the emblem 100 as described previously using the OEM stabilizing member 142 and/or mounting adaptor 144. Thus, an OEM stabilizing member/mounting adaptor 142/144 may be used to mount the emblem 100. In some embodiments other components used to mount the emblem 100, such as but not limited to the rods 124 and nuts 126 may also be OEM components. Thus, the emblem 100 is configured to seamlessly replace OEM emblems. In additional embodiments, the stabilizing member 142 and/or mounting adaptor 144 may not be an OEM component. In some embodiments, tape may need to be removed from the stabilizing member 142 and/or mounting adaptor 144 before installing the stabilizing member 142 and/or mounting adaptor 144.

Figure 7:
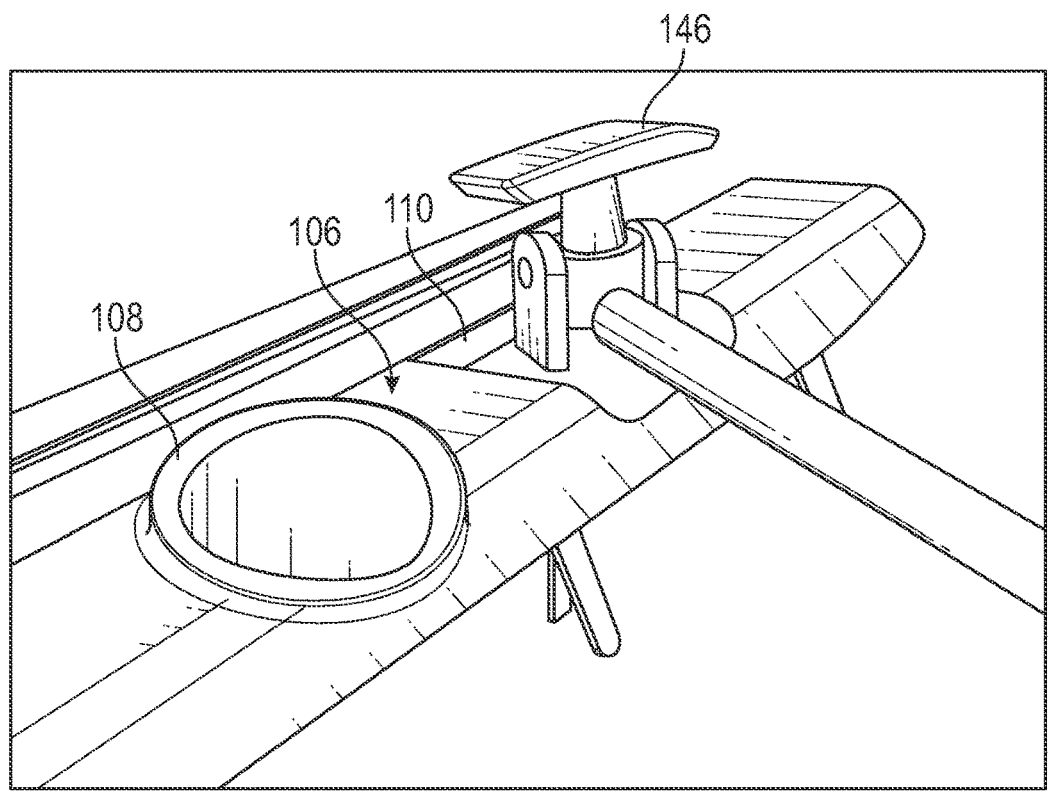
FIG. 7 is a perspective view of the bottom of an exemplary accessory according to some aspects of the disclosure.

FIG. 7 shows a view of the bottom 106 of an exemplary emblem 100. This embodiment includes a camera opening 108 and a washer nozzle opening 110. This embodiment also includes a washer nozzle cover 146. A washer nozzle cover 146 can be used to cover a washer nozzle such that no washer fluid escapes onto the front 101 of the emblem when the washer nozzle is not in use. Further, the washer nozzle cover 146 protects the washer nozzle opening 110 and the washer nozzle itself from foreign debris such as but not limited to dirt, sand, dust, and the like. During installation of the emblem 100, the washer nozzle cover 146 can be uninstalled before installing a camera assembly on the emblem 100. Then, after a camera assembly is installed on the emblem 100, the washer nozzle cover 146 can be reinstalled on the emblem 100. In some embodiments the washer nozzle cover can be an OEM component, while in other embodiments the washer nozzle cover is not an OEM component. Also, in some embodiments, a piece of tape can be applied to the back of the washer nozzle cover 146 before reinstalling the cover 146. The tape may help to protect the cover 146 as well as the washer nozzle 147.

Figure 8:
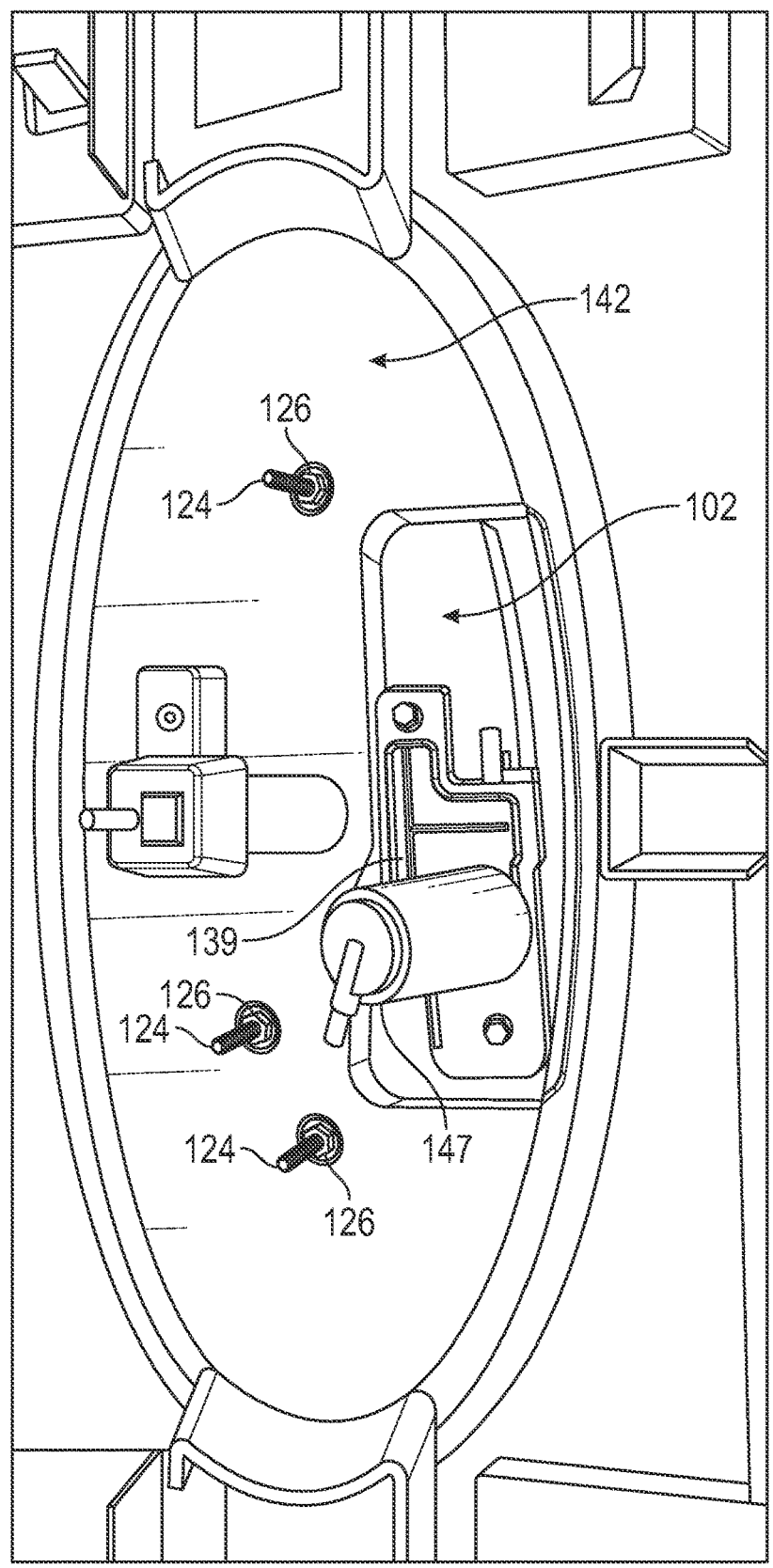
FIG. 8 is a perspective view of an exemplary accessory in a mounted state according to some aspects of the disclosure.

FIG. 8 shows an embodiment of an emblem in a mounted state. The embodiment shown in FIG. 8 includes a stabilizing member 142 which covers an emblem. The back side 102 of an emblem may include rod apertures 117. Also, the stabilizing member 142 may include rod apertures. Rods 124 may extend through the rod apertures 117 of the emblem (not visible in FIG. 8) and further extend through apertures of the stabilizing member 142 such that the rod apertures 117 of the back side 102 of the emblem are aligned with the apertures of the stabilizing member 142 through which the rods 124 extend. Nuts 126 are used to secure the emblem and stabilizing member 142, wherein the stabilizing member 142 is positioned between the nuts 126 and the emblem.

The embodiment of FIG. 8 also shows a camera assembly 139, which can also be referred to as a camera and washer nozzle assembly, that is secured to the back side 102 of the emblem. Although not visible in FIG. 8, the back side 102 of the emblem may include two fasteners 121. As can be seen in FIG. 8, two screws are used to attach the camera assembly 139 to the back 102 of the emblem via the fasteners 121. In this embodiment the screws fit into the fasteners 121. In this embodiment two fasteners are used, but the number of fasteners could number from zero to N, where N is any number greater than zero. In embodiments that use zero fasteners, other attachment apparatus may be used. Here the fasteners 121 are used to attach the back side 102 of the emblem to the camera assembly 139. The fasteners 121 may use screws, such as T25 torx screws. However, any screws could be used. Also, although screws are used in conjunction with the fasteners in this embodiment other attachment means could be used. For example, screws, nuts, bolts, pins, rivets, staples, washers, grommets, latches (including pawls), ratchets, clamps, clasps, flanges, ties, adhesives, welds, any other known fastening mechanisms, or any combination thereof may be used to facilitate fastening. The camera assembly 139 includes a washer nozzle 147. According to some aspects of the disclosure, the emblem 100 is configured to be capable of incorporating a washer nozzle 147. The washer nozzle 147 may be part of a washing system in which the washer nozzle can be used to wash the front 101 of the emblem 100 as well as wash the lens of the camera 138. As mentioned previously, the washer nozzle may be equipped with a washer nozzle cover 146 that keeps washer fluid from being released when it is undesirable to release washer fluid. The washer nozzle cover also protects the washer nozzle from foreign material entering the washer nozzle, wherein foreign material may include but is not limited to dirt, sand, sediment, and the like.

In some embodiments the camera assembly 139 may be an OEM component. In those instances the camera assembly 139 may first need to be uninstalled from the OEM emblem and then installed onto the presently disclosed emblem 100.

Figure 9:
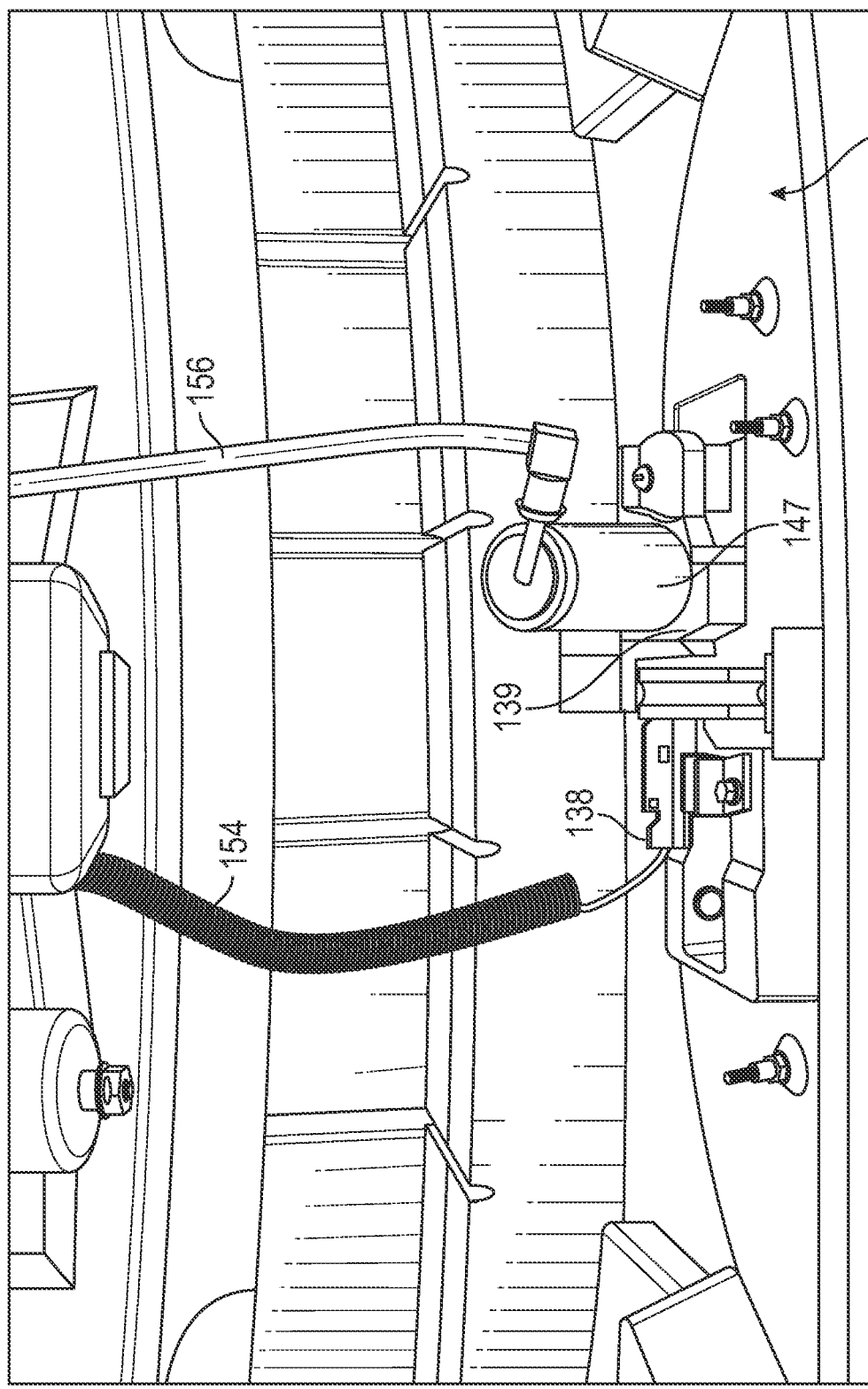
FIG. 9 is a perspective view of an exemplary accessory that includes a camera and washer nozzle wherein the camera and washer nozzle are operatively connected to the vehicle according to some aspects of the disclosure.

FIG. 9 shows an embodiment of an emblem in a mounted state. The embodiment includes a stabilizing member 142. The embodiment includes a camera assembly 139 attached to the back side 102 of the emblem. The camera assembly 139 of the embodiment of FIG. 9 includes a camera 138 and a washer nozzle 147. The camera 138 may be configured to act as a video camera and display that video within the vehicle, such that a driver or passenger in the vehicle may be able to view whatever the camera 138 displays. The embodiment also includes a camera connector 154 with one end connected to the camera 138 and the other end connected to the electrical system of the vehicle. Thus, the camera 138 may be powered, at least in part, by the electrical system of the vehicle. Also, the camera connector 154 may make it possible to display whatever the camera 138 views on a display positioned within the vehicle so that a driver and/or passengers can view the display. The camera 138 may be positioned at, near, or within the camera opening 108 located on the bottom 106 of the emblem according to some aspects of the disclosure.

FIG. 9 also shows a washer nozzle 147. As described above, the washer nozzle 147 may be part of washing system in which the front 101 of the emblem, the logo 107 of the emblem, and/or the lens of the camera 138 can be washed with some sort of fluid. FIG. 9 shows a washer nozzle connector 156, wherein one end is connected to the washer nozzle 147 and the other end is connected to washer fluid stored in the vehicle. The washer fluid stored by the vehicle can travel through the washer nozzle connector 156 to supply washer fluid to the washer nozzle 147. Additionally, the washer nozzle connector 156 may include wires or other apparatus to connect the washer nozzle 147 with the electrical system of the vehicle to power operation of the washer nozzle 147. In some embodiments the washer nozzle 147 is self-powered.

In some embodiments the camera connector 154 and washer nozzle connector 156 may be OEM components. In those instances, the camera connector 154 and washer nozzle connector 156 would first need to be uninstalled from the OEM emblem and then installed onto the presently disclosed emblem 100.

Figure 10:
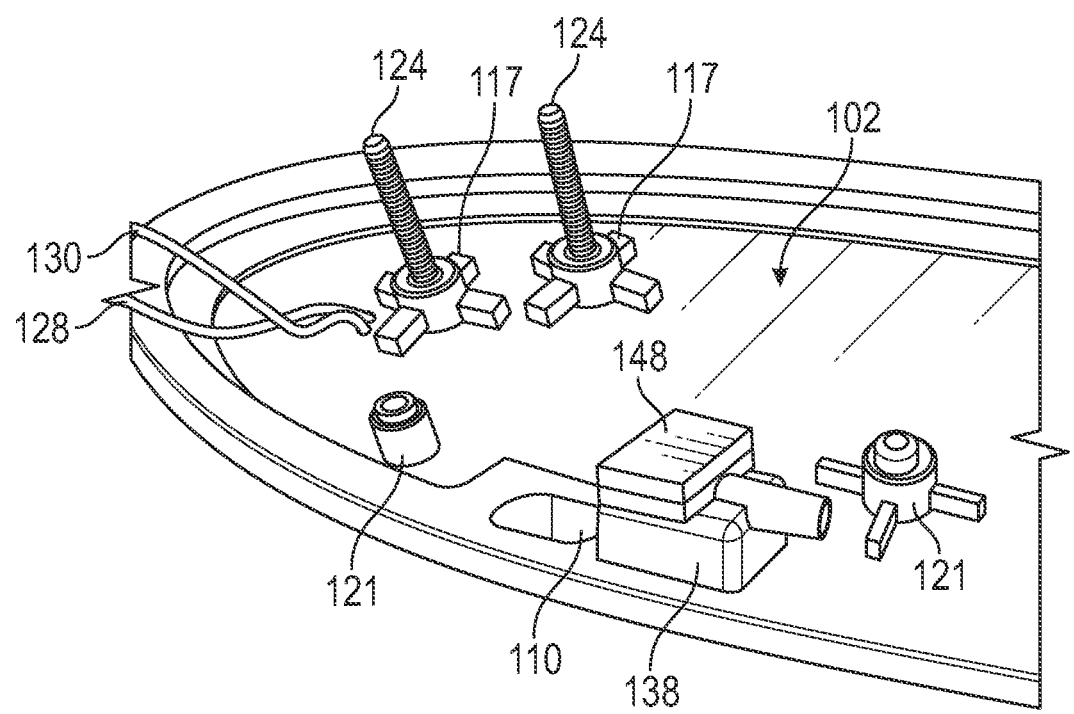
FIG. 10 is a perspective view of the back side of an exemplary accessory according to some aspects of the disclosure.

FIG. 10 shows another embodiment of the back 102 of the emblem 100. This embodiment includes two rod apertures 117, two rods 124 positioned within the rod apertures 117, two fasteners 121, a washer nozzle opening 110, a first wire 128, a second wire 130, and foam tape 148 covering the back of the camera 138. During installation of the emblem 100, foam tape 148 can be applied to the back of the camera 138 to prevent vibration. The camera assembly 139 can then be reinstalled/attached to the emblem 100 via inserting screws into the fasteners 121. As mentioned previously, attachment means other than inserting screws into the fasteners may be used.

Figure 11:
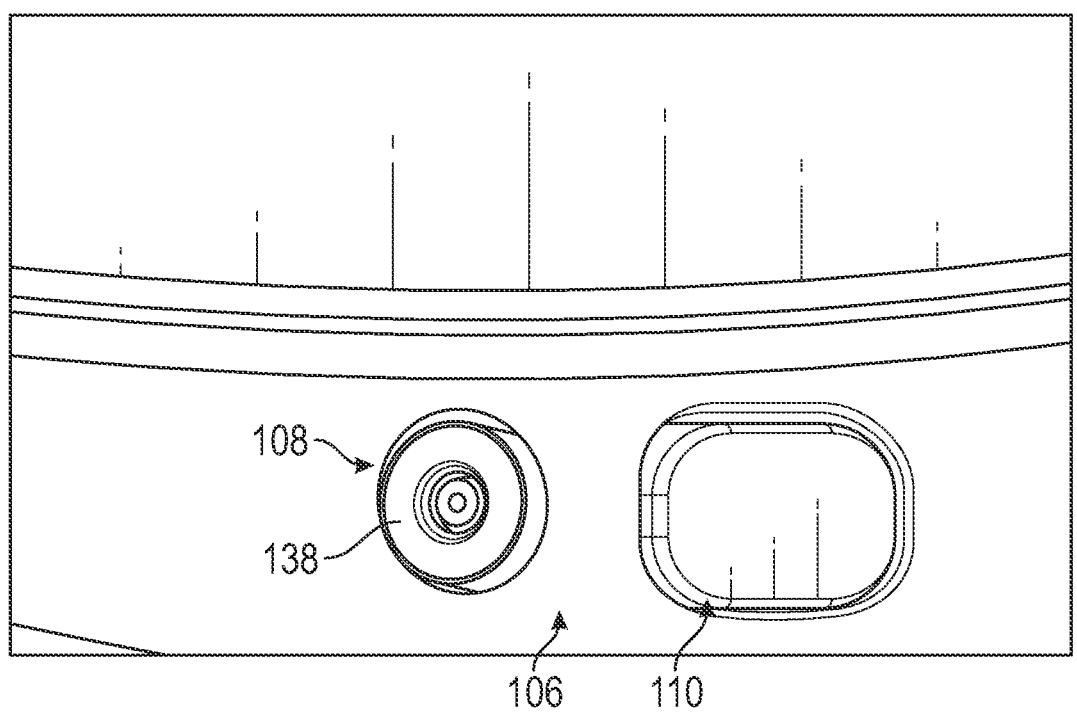
FIG. 11 is a perspective view of the bottom of an exemplary accessory according to some aspects of the disclosure.

FIG. 11 shows the bottom 106 of the emblem 100 according to one embodiment. This embodiment includes a camera opening 108 and a washer nozzle opening 110. FIG. 11 illustrates how a camera 138 can be positioned within, at, or near the camera opening 108.

Figure 12:
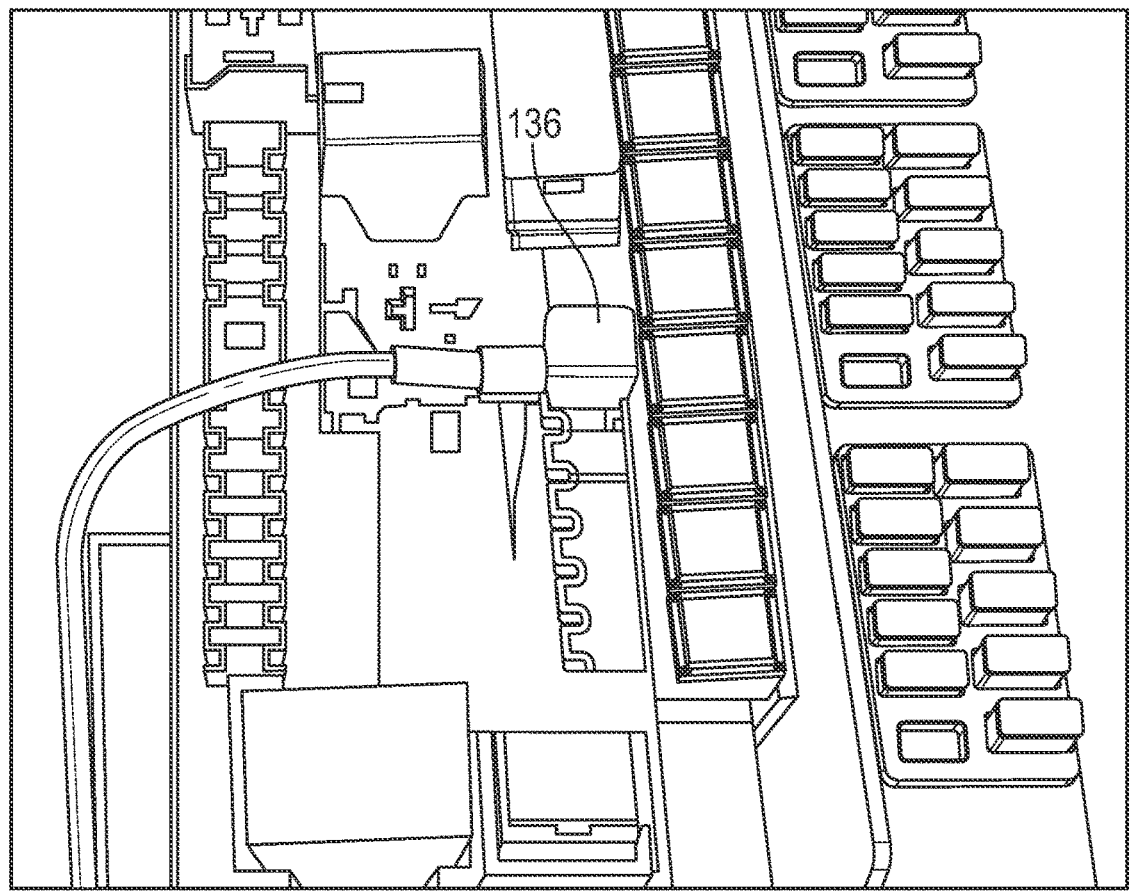
FIG. 12 is a perspective view of a fuse tap of an exemplary accessory connected to a fuse box according to some aspects of the disclosure.

FIGS. 12-15 show an exemplary electrical connection between an electrical system 234 of the vehicle and the emblem 100. The emblem 100 can be electrically connected to an electrical system 234 of the vehicle. In the embodiment of FIG. 12, the apparatus of the electrical system 234 to which the emblem 100 is electrically connected is the fuse box 232 of the vehicle. In order to connect to the fuse box 232, a fuse tap 136 may be used. A user may insert a 5-amp fuse, referred to as a first fuse 216, into the fuse tap 136. A user may remove fuse #18 or #34 (10-amp fuse), referred to as a second fuse 217, from the fuse box 232 and insert it into the fuse tap 136 along with the first fuse 216. Although this embodiment uses fuse #18 or #34 as the second fuse 217, any 10-amp fuse of the fuse box 232 may be used. Then a user may insert the fuse tap 136 into the fuse box 232 in the slot from which the second fuse 217 was removed. A user may plug and play when connecting the emblem to the fuse box 232. The electrical connection between the emblem 100 and the electrical system 234 of the vehicle will be described in greater detail later in the disclosure.

Figure 13:
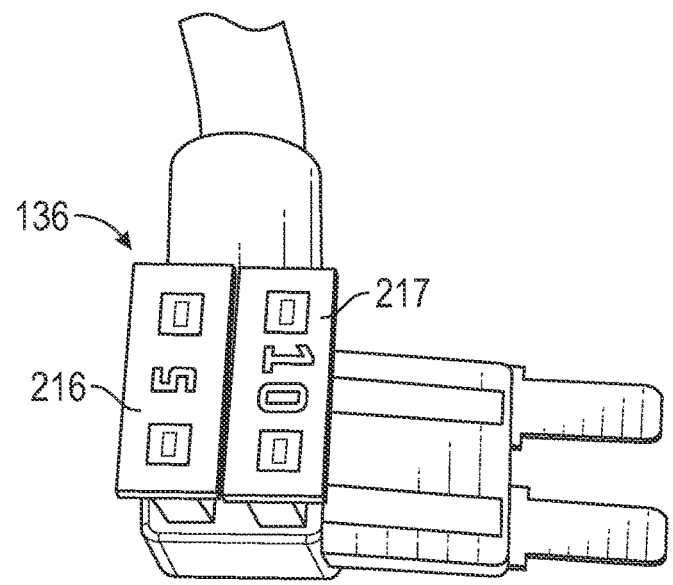
FIG. 13 is a perspective view of a first and second fuse connected to a fuse tap of an exemplary accessory according to some aspects of the disclosure.

FIG. 13 shows the two fuses, a first 5-amp fuse 216 and a second 10-amp fuse 217, wherein the second fuse 217 was removed from the fuse box 232. Both the first 216 and second 217 fuses may be inserted into the fuse tap 136. The fuse tap 136 is then inserted into the fuse box 232. The fuse tap 136 may be inserted into the fuse box 232 in the same slot from which the second fuse 217 was removed from the fuse box 232.

Figure 14:
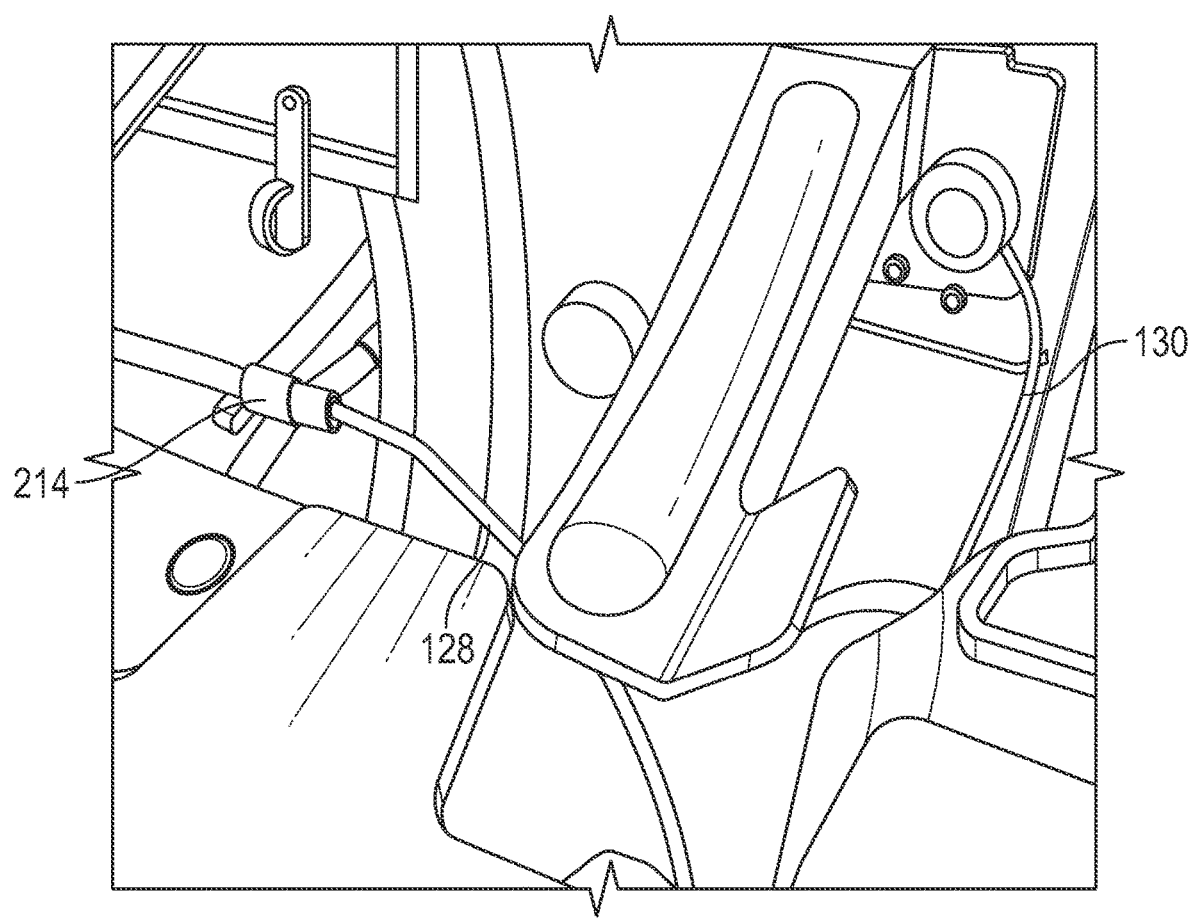
FIG. 14 is a perspective view of an exemplary accessory electrically connected to a vehicle via a fuse harness according to some aspects of the disclosure.

FIG. 14 shows part of the connection of the wire and/or wires of the emblem 100 to the electrical system of the vehicle. FIG. 14 shows the first wire 128 of the emblem 100 connected to a fuse harness/connector/jumper port 214. The fuse harness 214 is connected to the fuse tap 136, via a wire, so that when the fuse tap 136 is inserted into the fuse box 232 the emblem 100 is electrically connected to the fuse box/electrical system 232/234 via the first wire 128, the fuse harness 214, and the fuse tap 136. The second wire 130 may be connected to the chassis or other portion of the vehicle to serve as a ground. This embodiment represents one way in which the emblem 100 may be electrically connected to the electrical system 234 of the vehicle. The fuse tap 136 and the fuse harness 214 may be connected via a wire so that one end of the wire comprises the fuse tap 136, which can be inserted into the fuse box 232, and the other end of the wire comprises the fuse harness 214.

Figure 15:
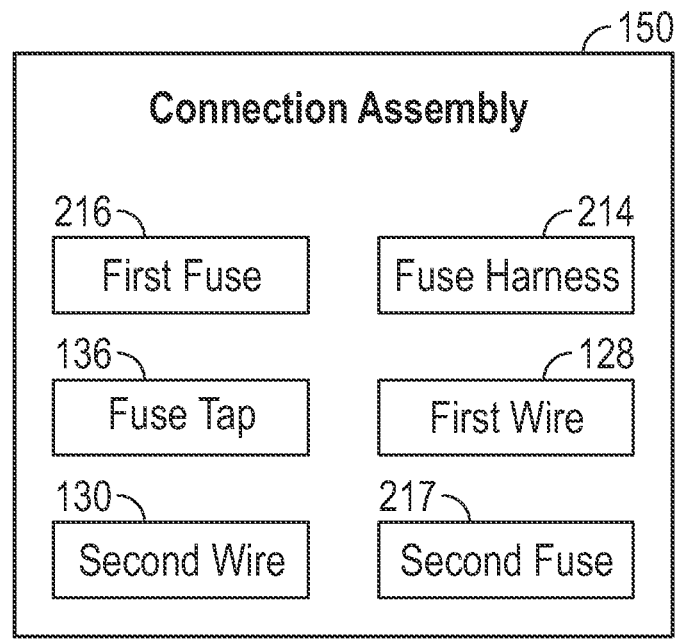
FIG. 15 is a block diagram of an exemplary connection assembly according to some aspects of the disclosure.

FIG. 15 provides an overview of an embodiment used to electrically connect the emblem 100 to the electrical system 234 of the vehicle. Electrical connection of the emblem 100 to the electrical system 234 of the vehicle may be accomplished via a connection assembly 150 as shown in FIG. 15 and as described above. The connection assembly may comprise first 128 and second 130 wires that are connected to the emblem 100 at one end. The other end of the second wire 130 may be ground to the chassis of the vehicle or to some other portion of the vehicle. The other end of the first wire 128 may be connected to the fuse harness/connector/jumper port 214. The fuse harness 214 can then be connected to the fuse tap 136. A first fuse 216 can be inserted into the fuse tap 136. A second fuse 217 can be removed from the fuse box 232 of the vehicle and can also be inserted into the fuse tap 136. The fuse tap 136, with the first and second fuses 216, 217 inserted into it, can then be inserted into the fuse box 232 of the vehicle. The fuse tap 136 can be inserted into the slot of the fuse box 232 from which the second fuse 217 was removed. Thus, in this way, the emblem 100 is electrically connected to the electrical system 234 of the vehicle. The components of the connection assembly 150 shown in FIG. 15 represent one exemplary embodiment of the connection assembly 150 and more or less components may be used in other embodiments. For example, more or less than two fuses could be used in conjunction with the fuse tap 136. More or less than two wires extending from the emblem could be used. Also, other components could be used other than a fuse harness and a fuse tap. The exemplary embodiment of a connection assembly 150 shown in FIG. 15, can generally be used to connect an emblem to the electrical system of a vehicle when the emblem is attached/mounted to the front of the vehicle. However, the connection assembly 150 of FIG. 15 could be used when the emblem is attached/mounted to other parts of the vehicle as well.

Figure 16:
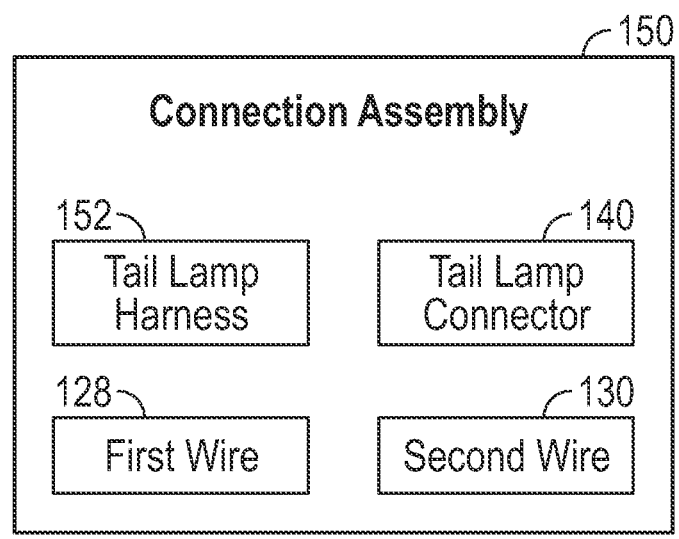
FIG. 16 is a block diagram of an exemplary connection assembly according to additional aspects of the disclosure.

FIG. 16 shows an exemplary embodiment of a connection assembly 150 that can generally be used to connect an emblem to the electrical system of a vehicle when the emblem is attached to the rear of the vehicle. This embodiment may include first 128 and second 130 wires connected to the emblem 100. The first 128 and/or second 130 wires stemming from the emblem 100 may include sleeving to protect the wire(s). The sleeving could be split loom, abrasion resistant, or any other suitable type of sleeving. Also the wire(s) 128, 130 may be secured via zip-tie(s) to protect the wire(s) from potential pinch points and/or sharp edges. The embodiment may also include one or more tail lamp connectors 140 and a tail lamp harness 152. The first and second wires 128, 130 may be spliced and connected to the tail lamp harness 152 via the one or more tail lamp connectors 140. The tail lamp connector(s) 140 may be splice connectors, tap connectors, or any other type of connector. The first wire 128 and second wire 130 may be connected to a wire or wires of the tail lamp harness 152. Similar to the embodiment of FIG. 15, the components of the connection assembly 150 shown in FIG. 16 represent one exemplary embodiment of the connection assembly 150 and more or less components may be used in other embodiments.

Figure 17:
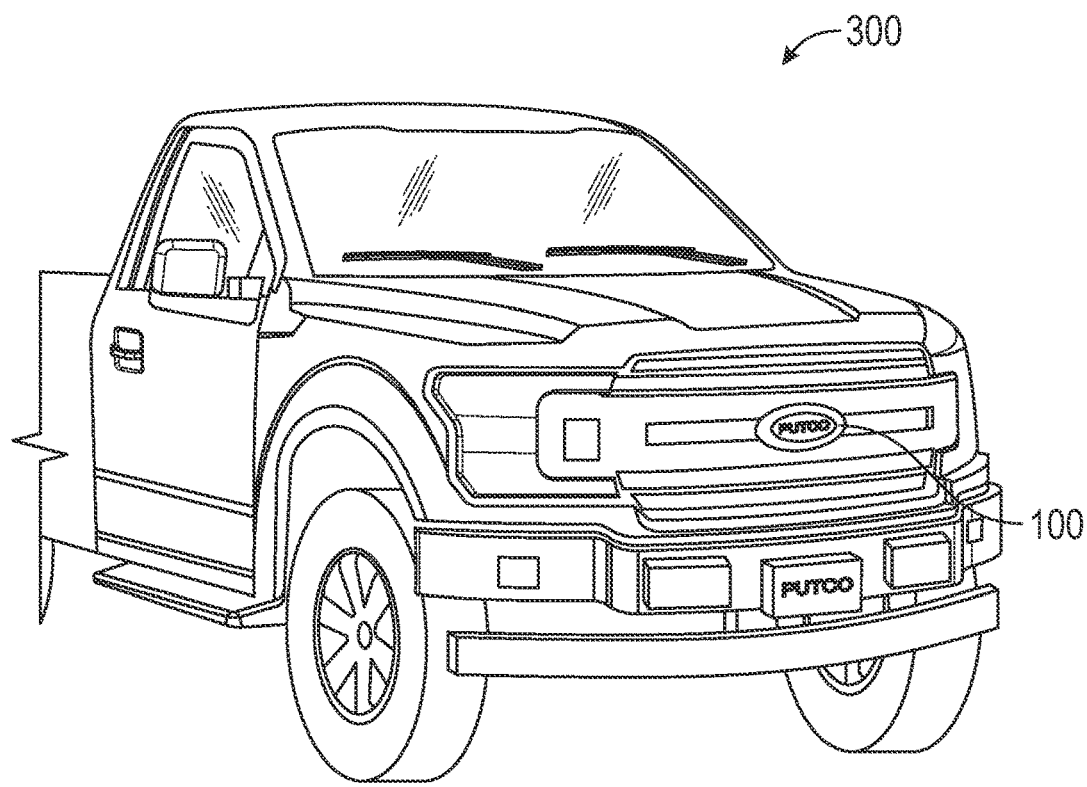
FIG. 17 is a perspective view of an exemplary accessory attached to the front of a vehicle according to some aspects of the disclosure.

FIG. 17 shows a generic vehicle 300 with an exemplary emblem 100 attached to the front of the vehicle. The emblem 100 is configured to seamlessly replace an OEM emblem. In the embodiment of FIG. 17, the emblem is attached to the grille of the vehicle 300, however the emblem may be attached anywhere an OEM emblem was attached to the vehicle. Attaching/mounting the emblem 100 to the front of a vehicle 300 may be easily completed using any of the methods and/or apparatuses described previously in the disclosure. Additionally, an OEM mount/stabilizing member may be used to install the disclosed lighted emblem. The connection assembly 150 of FIG. 15 may be used to electrically connect the emblem 100 to the vehicle's 300 electrical system 234. However, a different connection assembly having different components than those shown in FIG. 15 may be used.

Figure 18:
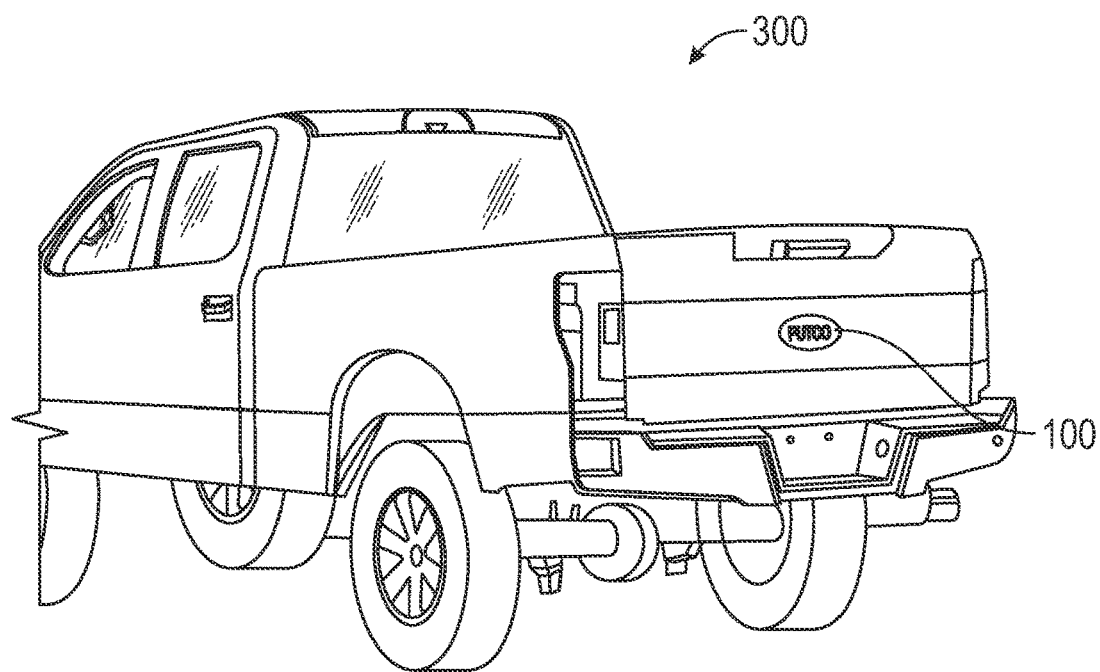
FIG. 18 is a perspective view of an exemplary accessory attached to the rear of a vehicle according to some aspects of the disclosure.

FIG. 18 shows another embodiment of a generic vehicle 300 with an exemplary emblem 100 attached to the rear of the vehicle 300. When attaching an emblem 100 to the rear of a vehicle, again, the emblem 100 is configured to seamlessly replace an OEM emblem. Therefore, while the emblem 100 of FIG. 18 is attached in the center of the tailgate of the vehicle 300, the emblem 100 can be attached anywhere on the vehicle 300 where an OEM emblem was attached. Attaching the emblem 100 to the rear of the vehicle 300 may be easily completed using any of the methods and/or apparatuses described previously in the disclosure. Additionally, just as with the emblem attached/mounted to the front of the vehicle 300 in FIG. 17, for the emblem attached/mounted to the rear of the vehicle 300 in FIG. 18 an OEM mount/stabilizing member may be used to install the disclosed lighted emblem. The connection assembly 150 of FIG. 16 may be used to electrically connect the emblem 100 to the vehicle's 300 electrical system 234. However, a different connection assembly having different components than those shown in FIG. 16 may be used. Furthermore, as can be seen in FIGS. 17 and 18, including a lighted emblem on the front and/or rear of a vehicle increases the visibility of that vehicle in that having lighted emblems allows other drivers and/or pedestrians to more easily notice and see the vehicle. At twilight and at night, this increased visibility will improve overall safety. Additionally, having a lighted emblem on the front and/or rear of a vehicle will improve its visibility, and thus, overall safety in instances of inclement weather such as rain, snow, sleet, fog, and the like.

Figure 19:
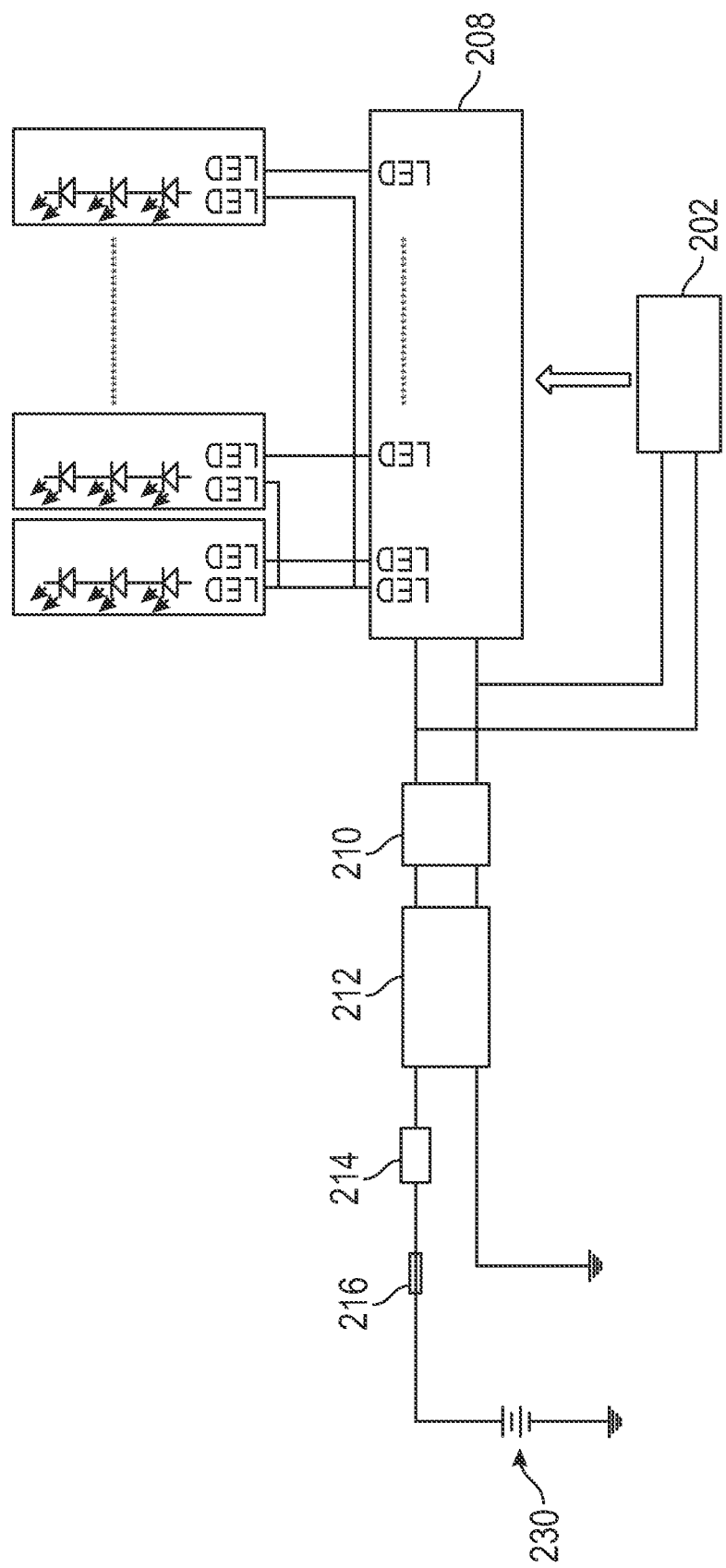
FIG. 19 is a schematic view of exemplary circuitry of an accessory according to some aspects of the disclosure.

FIG. 19 shows a schematic of exemplary circuitry of the emblem 100 according to some aspects of the disclosure. Some components of the circuitry shown in FIG. 19 are contained on the circuit board 200, which may be positioned within the emblem 100 in the hollow, enclosed space between the front 101 and back 102 of the emblem 100. Other components of the circuitry shown in FIG. 19 are found in the connection assembly 150. FIG. 19 shows a microcontroller unit 202 that controls the constant current control circuit 208, and thus, controls the lighting of the plurality of LEDs shown in FIG. 19. A suitable microcontroller unit is a PIC16F676 unit, however any other suitable microcontroller unit may be used. The constant current circuit 208 regulates current and provides a steady current to the plurality of LEDs. Oftentimes LEDs require a constant current, and if the current is too high the LEDs can be damaged. Thus, a constant current circuit 208 is provided to supply a constant current to the LEDs. The LEDs used in the emblem may comprise a chip on board ("COB") LEDs layout for crisp illumination day or night.

FIG. 19 also shows an electromagnetic interference filter circuit 210 (EMI filter circuit), which can also be referred to as a radio-frequency interference filter circuit (RFI filter circuit). The terms EMI filter and RFI filter can be used interchangeably in the disclosure. The RFI filter circuit 210 shown in FIG. 19 is included to protect against the potentially harmful impacts of exposure to radio-frequency interference. According to some aspects of the disclosure, the RFI filter circuit 210 may comprise any combination of inductors and/or capacitors in order to achieve proper filtration of radio-frequency interference. However, any off-the-shelf RFI filter may be used.

FIG. 19 also shows a transient protection circuit 212. Transients are momentary spikes in current or voltage that may be experienced by a circuit or system. Transients can damage and/or disrupt components and products that are part of a circuit. According to some aspects of the disclosure, transient protection 212 is included. According to some aspects of the disclosure, transient protection may be achieved in different ways. One embodiment may include a transient suppressor 218 that is capable of suppressing transient voltage, current, and/or transition times of the circuit of the embodiment. The embodiment may also include one or more transient voltage suppressors to suppress transient voltage.

FIG. 19 also shows a fuse harness 214, a fuse, and a power source 230 included as part of the embodiment. As described previously, the components of the circuit contained within the emblem may be attached to a fuse harness 214, which is then attached to a fuse tap 136 that includes at least one fuse, may include a second fuse, and may include more than two fuses. The fuse tap 136 containing the at least one fuse can then be attached to a power source 230 and to the electrical system 234 of the vehicle. The power source 230 may be a fuse box 232, battery, or something of the like.

FIG. 19 also shows a plurality of LEDs. As will be described later in the disclosure, the LEDs may be placed within the emblem 100 in the hollow, enclosed space between the front 101 and back 102 of the emblem 100. The LEDs may be positioned within the emblem 100 so that they are aligned with the translucent portions of the front 101 of the emblem 100 and/or the translucent portions of the logo 107 of the emblem 100. Therefore, when the LEDs are illuminated (i.e., turned ON), light will escape from the translucent portions of the logo 107 and/or front 101 of the emblem 100.

According to some aspects of the disclosure, the circuit and LEDs are capable of producing light with varying characteristics. For example, the emitted light may vary based on its intensity. In some situations, the emitted light may have a relatively high intensity while in other situations a relatively low intensity. As an example, when a driver of a vehicle to which an emblem is attached turns on the vehicle's headlights, light may be emitted from the emblem at a relatively lower intensity than when the driver turns on the vehicle's high beam ("bright") headlights wherein the light emitted from the emblem may have a relatively higher intensity. The previous was simply an example of a situation in which light intensity may vary. However, light intensity may vary in many situations. Additionally, the intensity of the emitted light may vary based on the type of LEDs that are used as well as other attributes. The intensity of the light may also be user-controlled.

Further, the light emitted from an emblem may vary based on color temperature. Emitted light may be white light, such as is typical to be emitted from a vehicle's headlights. Also, emitted light may be red light, such as is typical to be emitted from a vehicle's taillights. The emitted light may include other colors as well, other than white or red light. When an emblem is attached to the front of a vehicle, the emitted light may be white light. Also, when an emblem is attached to the rear of a vehicle, the emitted light may be red light. However, regardless of where an emblem is attached to a vehicle (front, rear, or otherwise), the emitted light may vary and may emit any color. The color of light emitted may vary based on the type of LEDs that are used, the nature of the translucent material that forms at least a portion of the logo 107 and/or front 101 of the emblem, and/or the color may be based on other attributes. The color of the emitted light may be user-controlled.

Even further, the light emitted from an emblem may vary based on beam pattern/shape. For instance, the emitted light may employ a relatively narrow beam and/or a relatively wide beam. Additionally, the beam pattern may be a flood beam, a spot beam, a hybrid beam, a beam in which all LEDs are illuminated at the same time, or may be some other type of beam. Additional beam patterns and/or shapes may be used. The beam pattern/shape may be user-controlled. While intensity, color temperature, and beam pattern/shape are all examples of characteristics of the light produced by the emblem 100 that may vary, other characteristics of the light produced by the emblem 100 may vary as well.

FIGS. 20A-20D show a detailed schematic of the circuitry involved according to some aspects of the disclosure. FIGS. 20A-20D contain one or more transistors labeled as G, one or more diodes labeled as D, one or more capacitors labeled as C, one or more resistors labeled as R, one or more LEDs labeled as LED, and one or more inductors labeled as L. As an example, the one or more transistors G may be a SK2310 or HS25N06DA model transistor, however, any suitable transistor may be used. As an example, the one or more diodes D may be an SS54 or 5819 model diode, however, any suitable diode may be used. As an example, the one or more capacitors C may range from 0.1-10 micro-Farad capacitors, however, any suitable capacitor regardless of capacitance may be used. Additionally, as an example, the maximum amount of voltage the one or more capacitors C may be exposed to may range from 25-50 volts, however, any suitable capacitor regardless of maximum voltage may be used. As an example, the one or more resistors R may range from a 100-ohm resistor to a 10K ohm resistor, however, any suitable resistor regardless of resistance level may be used. As described previously in the disclosure, the one or more LEDs, each labeled as LED, may be capable of producing varying intensity, color, and/or beam pattern/shape. Any suitable LED may be used. As an example, the one or more inductors L may be 47 μH/3A inductors, however, any suitable inductor regardless of its inductance may be used.

FIGS. 20A-20D also show a microcontroller 202. As an example, the microcontroller unit 202 may be a PIC16F676 model microcontroller, however, any suitable microcontroller unit may be used. The microcontroller 202 is used to control the functionality of the system, including controlling the illumination of the one or more LEDs included as part of the circuitry. Each group of LEDs can be turned ON or OFF by the corresponding pin of the microcontroller 202. Each portion of the circuit stemming from each pin is labeled as SEGMENT1-SEGMENT10. For example, if it is desired to turn the group of LEDs connected to SEGMENT1 ON or OFF, the microcontroller 202 can manipulate the pin corresponding to SEGMENT1 to turn the LEDs ON or OFF. In some embodiments, the microcontroller 202 may control the variable characteristics of the light emitted by the emblem such as the intensity, color, and/or beam pattern/shape.

FIGS. 20A-20D also show a voltage converter 204. As an example, the converter 204 may be an XL4201 model converter, however, any suitable voltage converter may be used. The converter 204 may be used to convert a lower voltage to a higher voltage (step up) and/or convert a higher voltage to a lower voltage (step down). The converter 204 may be DC-DC, DC-AC, AC-DC, and/or AC-AC. The converter 204 may be included to help provide the proper voltage level to the components of the emblem and the components of the connection assembly.

FIGS. 20A-20D also show a voltage regulator 206. As an example, the voltage regulator 206 may be a 7550-E regulator, however, any suitable voltage regulator could be used. The voltage regulator 206 may be either a linear or switching voltage regulator. The voltage regulator 206 could be a feed-forward regulator or may include negative feedback. Also, the voltage regulator 206 may use electromechanical components or electronic components. The voltage regulator 206 generates a constant, fixed output voltage regardless of changes to its input voltage or load conditions.

Figure 20A:
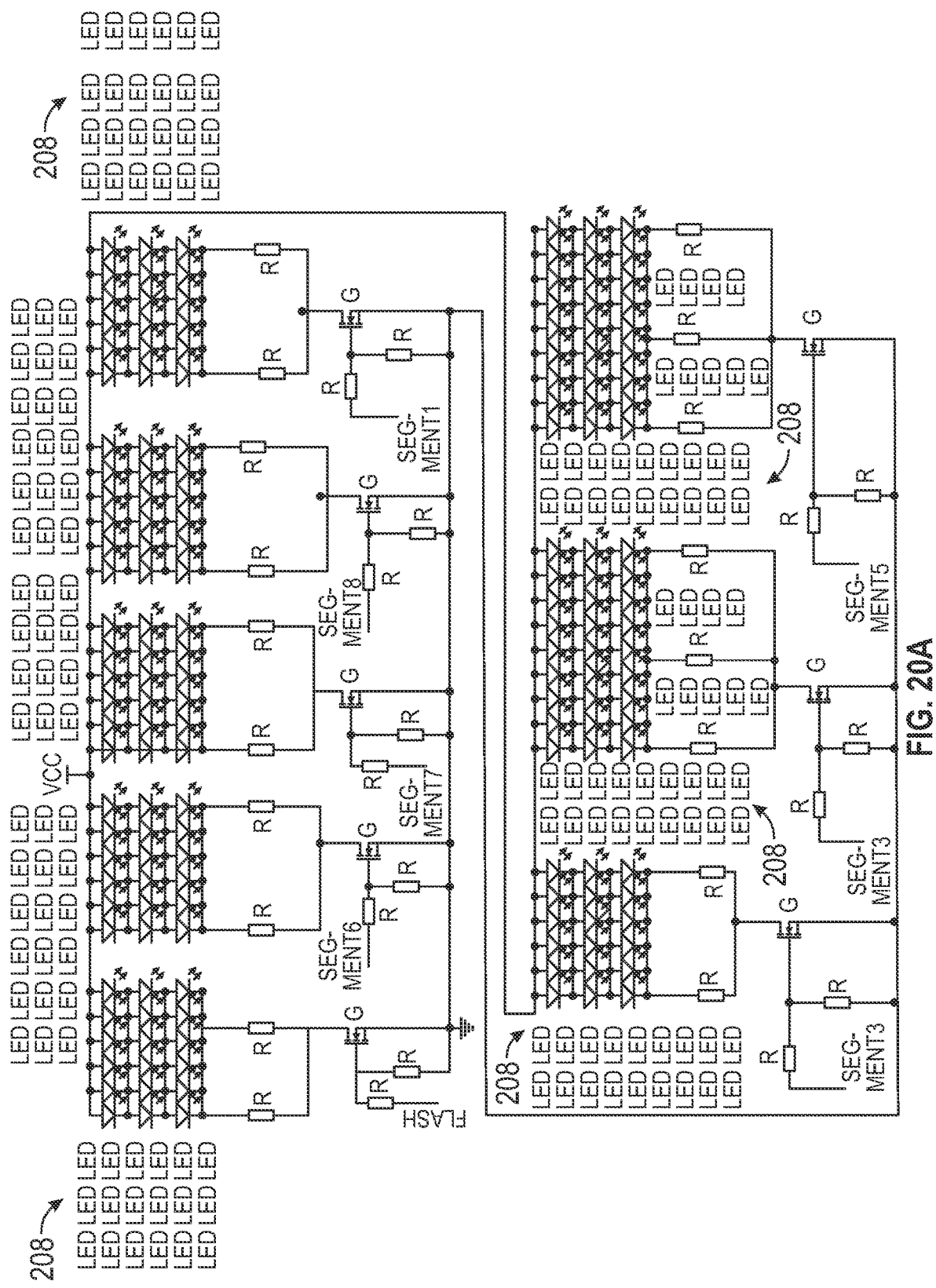
FIG. 20A is a partial view of an exemplary schematic of the circuitry of an accessory shown in FIGS. 20A-20D according to some aspects of the disclosure.
Figure 20B:
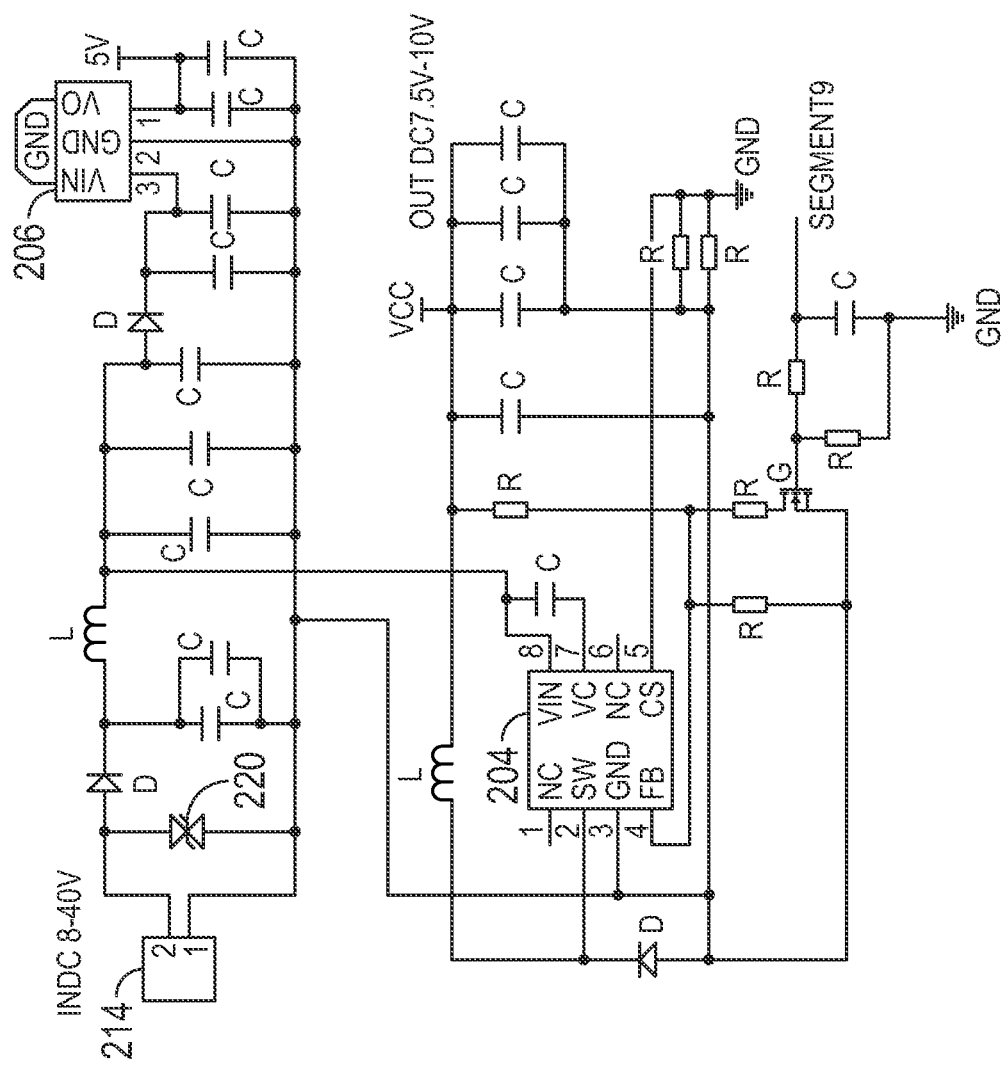
FIG. 20B is a partial view of the exemplary schematic of the circuitry of an accessory shown in FIGS. 20A-20D according to some aspects of the disclosure.
Figure 20C:
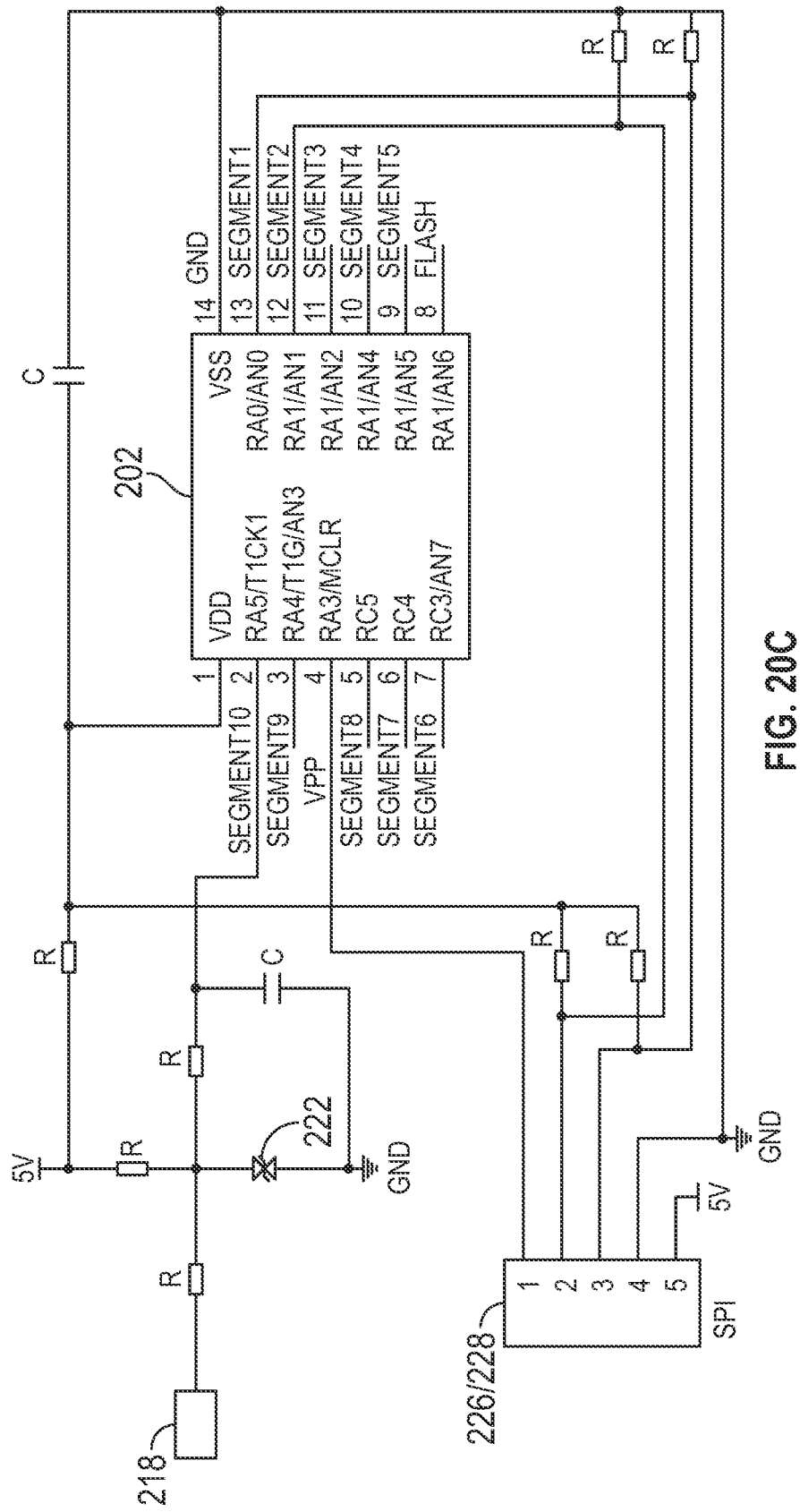
FIG. 20C is a partial view of the exemplary schematic of the circuitry of an accessory shown in FIGS. 20A-20D according to some aspects of the disclosure.
Figure 20D:
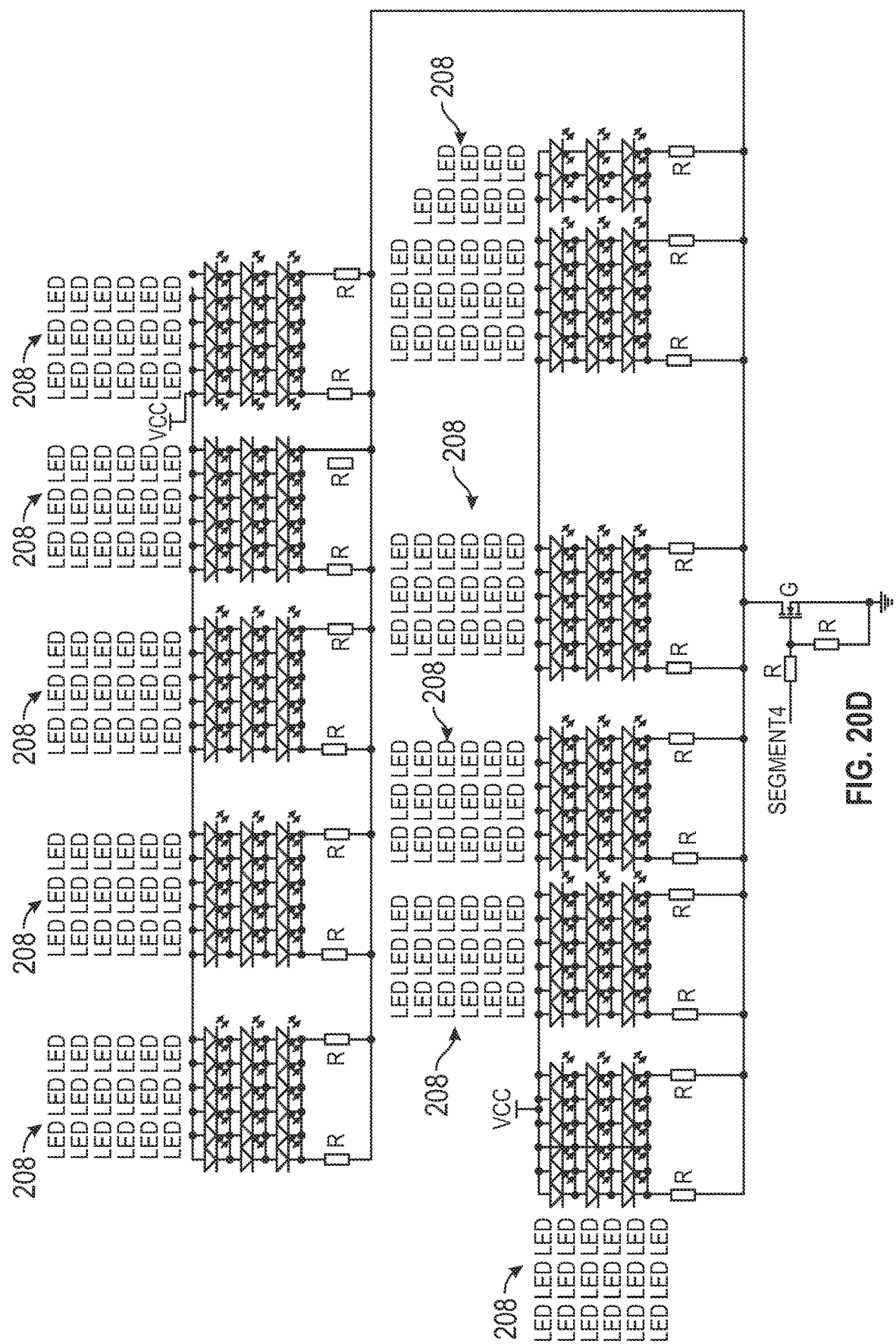
FIG. 20D is a partial view of the exemplary schematic of the circuitry of an accessory shown in FIGS. 20A-20D according to some aspects of the disclosure.

FIG. 20B shows the fuse harness 214, which can also be referred to as a jumper port. As described previously, the circuitry housed within the emblem in the hollow, enclosed space between the front 101 and back 102 of the emblem can be connected to the fuse harness 214. The fuse harness 214 can then be connected to the electrical system of the vehicle to which the emblem is attached/mounted. FIG. 20B also specifies input and output voltage ranges for the portion of the circuit shown in FIG. 20B. These specified ranges are simply exemplary, and other voltages may be used for the input and output of the portion of the circuit shown in FIG. 20B.

The exemplary embodiment shown in FIGS. 20A-20D may also include a transient suppressor 218. As described previously, the transient suppressor 218 is capable of suppressing transient voltage, current, and/or transition times of the circuit of the embodiment. The embodiment of FIGS. 20A-20D also includes a first transient voltage suppressor 220 and a second transient voltage suppressor 222. The first and second transient voltage suppressors 220, 222 suppress transient voltages. Transient voltages have the potential to damage and/or disrupt components of the circuitry. The first transient voltage suppressor 220 may be a SMBJ30A model transient voltage suppressor and the second transient voltage suppressor 222 may be a SMAJ7.0A or SMAJ7.0CA transient voltage suppressor, however, any suitable transient voltage suppressor may be used for the first or second transient voltage suppressors 220, 222.

The exemplary embodiment shown in FIGS. 20A-20D also includes a second jumper port 226 which comprises a serial peripheral interface (SPI) bus 228. The second jumper port 226, in combination with the serial peripheral interface bus 228, is able to provide serial communication throughout the system/circuitry. The exemplary circuitry of FIGS. 20A-20D, with the exception of the fuse harness 214, can be included as part of a circuit board 200 that is housed within the emblem 100 in the hollow, enclosed space between the front 101 and back 102 of the emblem 100.

Figure 21A:
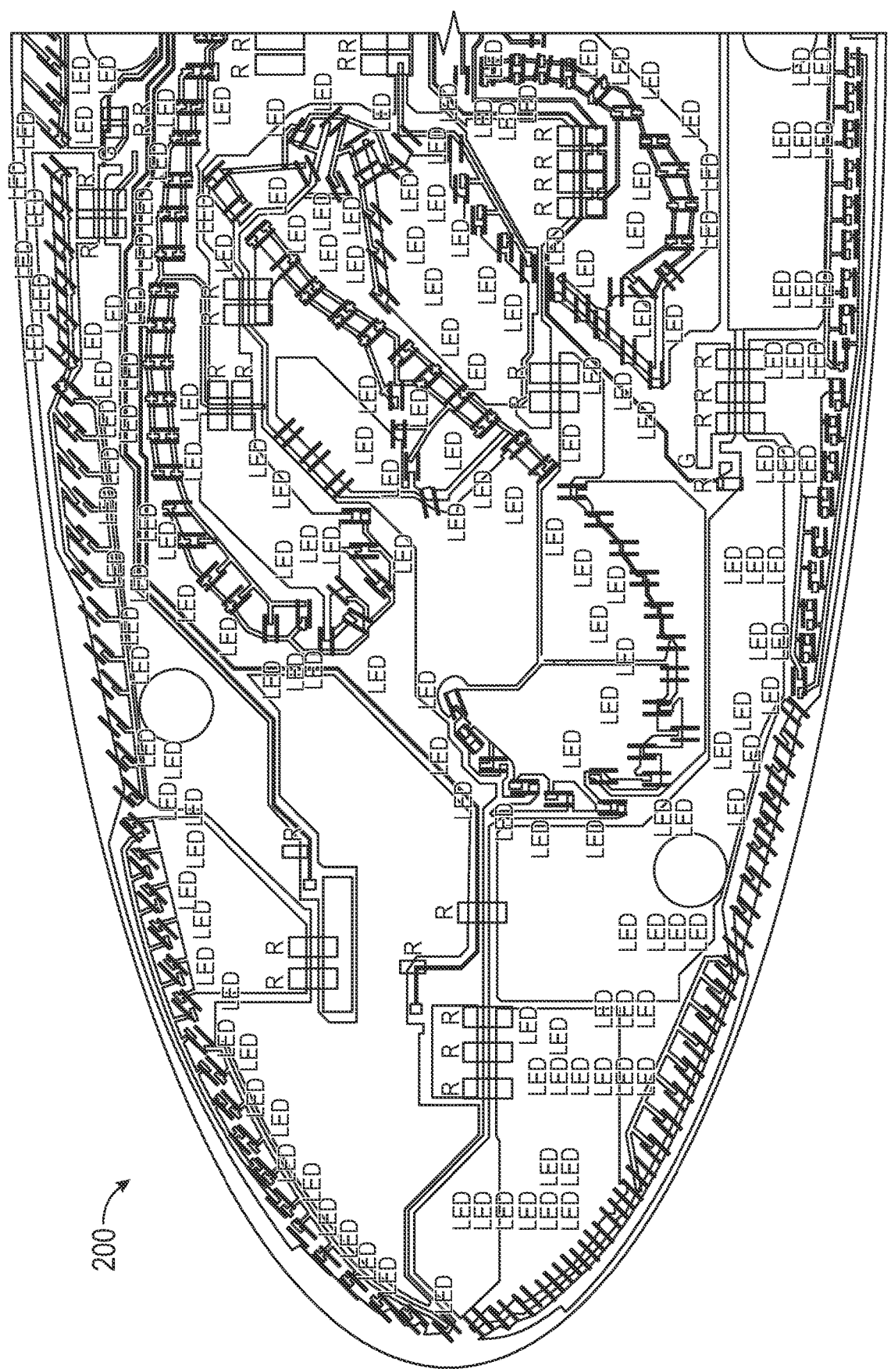
FIG. 21A is a partial view of an exemplary circuit board of an accessory shown in FIGS. 21A and 21B according to some aspects of the disclosure.
Figure 21B:
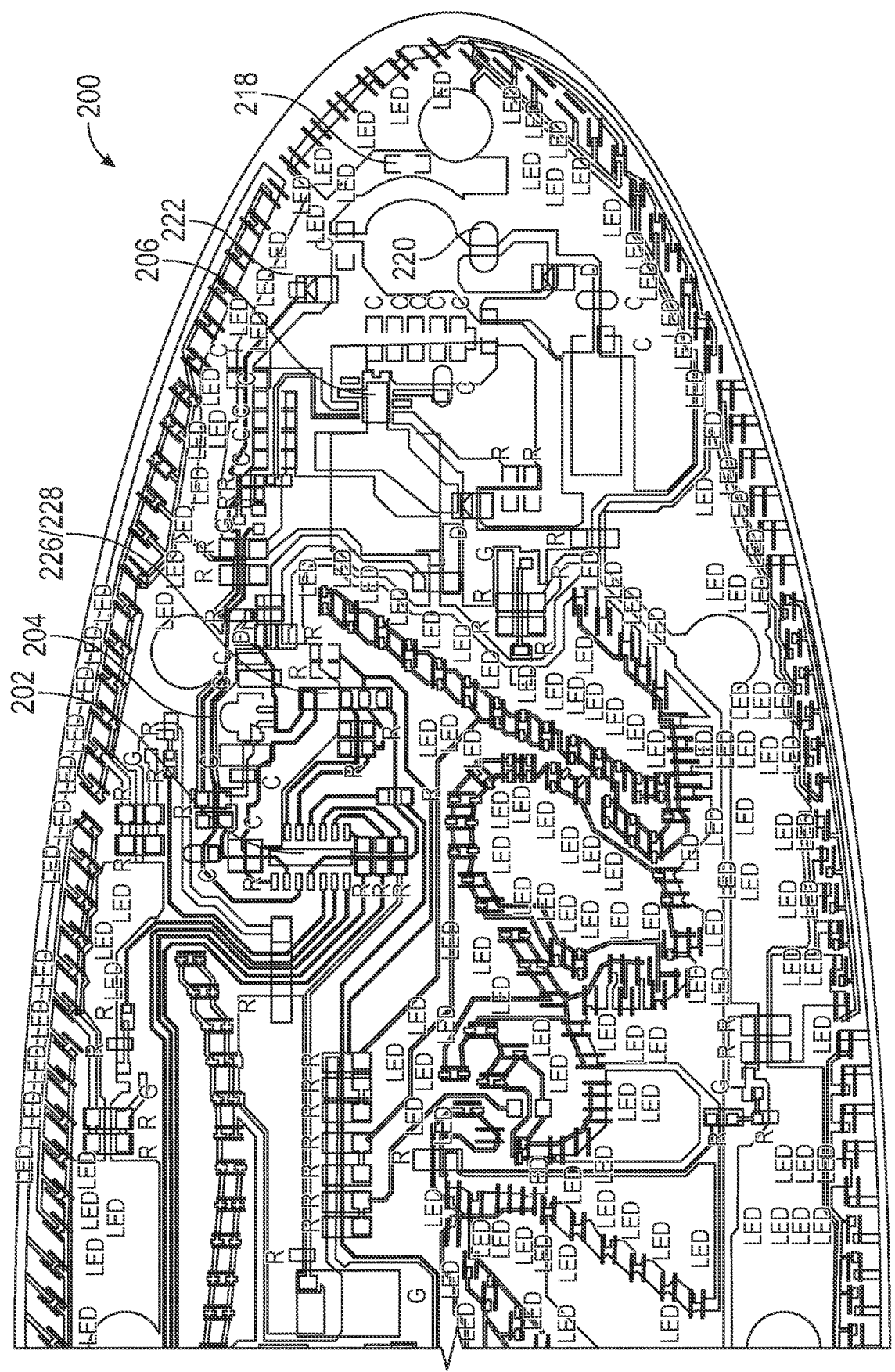
FIG. 21B is a partial view of the exemplary circuit board of an accessory shown in FIGS. 21A and 21B according to some aspects of the disclosure.

FIGS. 21A and 21B show the circuit board 200. The circuit board 200 can be contained within the emblem 100 in the hollow, enclosed space between the front 101 and back 102 of the emblem 100. The exemplary circuit board 200 shown in FIGS. 21A and 21B includes most of the components of the circuitry shown in FIGS. 20A-20D with the exception of the fuse harness 214, which is not positioned on the circuit board 200 but rather is separate from the circuit board 200 according to some embodiments. As described previously, the circuit board 200 may include one or more wires used to electrically connect the circuit board 200 to the fuse harness 214, and eventually to the electrical system 234 of the vehicle to which the emblem is mounted. The circuit board 200 shown in FIGS. 21A and 21B is the same embodiment of the system/circuitry as that shown in FIGS. 20A-20D with the exception of not showing the fuse harness 214 in FIGS. 21A and 21B.

As described previously, FIGS. 21A and 21B show the LEDs aligned with the translucent parts of the logo 107 and/or front 101 of the emblem 100. Therefore, when the LEDs are turned ON, light is emitted from the emblem 100.

Therefore, as understood from the present disclosure, the lighted accessory/emblem provided is aesthetically pleasing in that it emits light, and the accessory/emblem is able to seamlessly replace an OEM emblem using an OEM mount/stabilizing member via the steps described above. Additionally, the method steps provided allow for the lighted emblem to easily replace an OEM emblem.

Further, the lighted accessory/emblem provided mitigates RF emissions as evidenced by the inclusion of an RFI filter circuit.

Further, the lighted accessory/emblem increases the visibility of the vehicle to which the emblem is mounted, making it easier for drivers and/or pedestrians to see the vehicle in situations where it is dark outside or there is inclement weather. Thus, the lighted accessory/emblem improves overall safety.

Further, the lighted accessory/emblem provided is compatible with a camera and/or washing system, as some embodiments include an opening for a camera and/or nozzle washer to be positioned.

Further, the lighted accessory/emblem provided allows for a user to plug and play with the fuse box in order to electrically connect the emblem to the electrical system of the vehicle. The emblem may include a connection assembly to which the emblem can be connected, and which can then be connected to a vehicle's electrical system.

Further, the lighted accessory/emblem provided is adapted to deliver light with variable characteristics. Said characteristics can include, but are not limited to intensity, color temperature, and beam pattern/shape (narrow beam, wide beam, etc.).

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| | List of Reference Characters |
|---|---|
| 100 | Accessory/emblem |
| 101 | Front of accessory/emblem |
| 102 | Back of accessory/emblem |
| 103 | Right-hand side of accessory/emblem |
| 104 | Left-hand side of accessory/emblem |
| 105 | Top of accessory/emblem |
| 106 | Bottom of accessory/emblem |

TABLE 1-continued

List of Reference Characters

| | |
|---|---|
| 107 | Logo |
| 108 | Camera opening |
| 110 | Washer nozzle opening |
| 112 | First rod aperture |
| 114 | Second rod aperture |
| 116 | Third rod aperture |
| 117 | Generic rod aperture |
| 118 | First fastener |
| 120 | Second fastener |
| 121 | Generic fastener |
| 122 | Wire aperture |
| 124 | One or more rods |
| 126 | One or more nuts |
| 128 | First wire |
| 130 | Second wire |
| 136 | Fuse tap |
| 138 | Camera |
| 139 | Camera assembly |
| 140 | Tail lamp connector |
| 142 | Stabilizing member |
| 144 | Mounting adaptor |
| 146 | Washer nozzle cover |
| 147 | Washer nozzle |
| 148 | Foam tape |
| 150 | Connection assembly |
| 152 | Tail lamp harness |
| 154 | Camera connector |
| 156 | Washer nozzle connector |
| 200 | Circuit board |
| 202 | Microcontroller unit |
| 204 | Voltage converter |
| 206 | Voltage regulator |
| 208 | Constant current control unit |
| 210 | EMI/RFI filter circuit |
| 212 | Transient protection circuit |
| 214 | Fuse harness/first jumper port/connector |
| 216 | First fuse |
| 217 | Second fuse |
| 218 | Transient suppressor |
| 220 | First transient voltage suppressor |
| 222 | Second transient voltage suppressor |
| 226 | Second jumper port/wire connector |
| 228 | Serial peripheral interface (SPI) bus |
| 230 | Power source |
| 232 | Fuse box |
| 234 | Electrical system |
| 300 | Vehicle |
| G | One or more transistors |
| D | One or more diodes |
| C | One or more capacitors |
| R | One or more resistors |
| LED | One or more light emitting diodes (LEDs) |
| L | One or more inductors |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A lighted accessory for use with a vehicle, the accessory comprising:
   a housing comprising:
      a front side, wherein at least a portion of the front side is translucent; and
      a back side, wherein the back side of the accessory is operatively attached to the front side;
   a circuit board positioned between the front side and back side, said circuit board comprising:
      a plurality of light emitting diodes (LEDs) in alignment with the translucent portions of the front side of the accessory;
      a microcontroller to control when the plurality of LEDs are powered ON and OFF; and
      a radio-frequency interference filter circuit (RFI circuit) to mitigate RF emissions; and
   a connection assembly adapted to electrically connect the accessory with an electrical system of the vehicle.

2. The accessory of claim 1, wherein the circuit board further comprises a transient protection circuit.

3. The accessory of claim 2, wherein the transient protection circuit comprises at least one of a transient suppressor and a transient voltage suppressor.

4. The accessory of claim 1, wherein the front side of the emblem further comprises a logo, a camera opening, and a washer nozzle opening.

5. The accessory of claim 1, wherein the connection assembly comprises a first fuse, a second fuse, a fuse harness, a fuse tap, and at least one wire, wherein the first fuse, second fuse, fuse harness, and fuse tap are electrically connected to the circuit board via the at least one wire, and the fuse tap is adapted to connect the circuit board to the electrical system of the vehicle.

6. The accessory of claim 5, wherein the fuse harness is a first jumper port.

7. The accessory of claim 6, further comprising a second jumper port that is located on the circuit board and comprises a serial peripheral interface (SPI) bus.

8. The accessory of claim 1, wherein the back side of the emblem further comprises at least one aperture for mounting the emblem to the vehicle and at least one aperture for at least one wire to extend therethrough.

9. The accessory of claim 1, wherein the circuit board further comprises a constant current control circuit that, in conjunction with the microcontroller, provides a steady current to the plurality of LEDs.

10. The accessory of claim 1, wherein the RFI filter circuit comprises a combination of at least one inductor and at least one capacitor.

11. The accessory of claim 1, wherein the electrical system of the vehicle comprises at least one of a fuse box and power source.

12. The accessory of claim 1, wherein the accessory is compatible with a camera and washing system.

13. The accessory of claim 1, wherein the plurality of LEDs comprises a chip on board ("COB") LEDs.

* * * * *